United States Patent
Park et al.

(10) Patent No.: US 10,178,462 B2
(45) Date of Patent: Jan. 8, 2019

(54) WEARABLE ELECTRONIC DEVICE AND OPERATING METHOD THEREOF

(71) Applicant: Samsung Electronics Co., Ltd., Suwon-si, Gyeonggi-do (KR)

(72) Inventors: Sang-Il Park, Seoul (KR); Dongkyu Lee, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/665,989

(22) Filed: Aug. 1, 2017

(65) Prior Publication Data

US 2018/0048953 A1 Feb. 15, 2018

(30) Foreign Application Priority Data

Aug. 9, 2016 (KR) .................. 10-2016-0101172

(51) Int. Cl.
*H04R 1/10* (2006.01)
*G06F 3/16* (2006.01)

(52) U.S. Cl.
CPC .......... *H04R 1/1041* (2013.01); *G06F 3/162* (2013.01); *H04R 1/1016* (2013.01); *H04R 1/1033* (2013.01); *H04R 1/1058* (2013.01); *H04R 2420/07* (2013.01)

(58) Field of Classification Search
CPC .. H04R 1/1041; H04R 29/001; H04R 1/1008; H04R 1/1066; H04R 1/1075; H04R 2420/03; H04R 5/033; H04R 2430/01; H04R 3/12

USPC ............... 381/74, 309, 334; 361/679.03
See application file for complete search history.

(56) References Cited

U.S. PATENT DOCUMENTS

| | | | |
|---|---|---|---|
| 2008/0037816 A1 | 2/2008 | Lee et al. | |
| 2014/0120983 A1* | 5/2014 | Lam ................... | H04W 84/18 455/557 |
| 2016/0048292 A1* | 2/2016 | Hu ....................... | G06F 3/044 345/174 |
| 2016/0117141 A1* | 4/2016 | Ro ........................ | G06F 3/1454 715/748 |
| 2016/0205459 A1* | 7/2016 | Kamada ............... | H04R 1/1041 381/74 |
| 2016/0205460 A1* | 7/2016 | Tachibana ............ | H04R 1/1041 381/74 |
| 2017/0007183 A1* | 1/2017 | Dusan .................. | A61B 5/6831 |

FOREIGN PATENT DOCUMENTS

| | | |
|---|---|---|
| EP | 2 802 155 A1 | 11/2014 |
| KR | 10-0762626 B1 | 10/2007 |

* cited by examiner

*Primary Examiner* — Melur Ramakrishnaiah
(74) *Attorney, Agent, or Firm* — Jefferson IP Law, LLP

(57) ABSTRACT

An electronic device is provided. The electronic device includes a housing having a wearable shape configured to be worn on a human body, a coupling device disposed to at least one area of the housing and changeable from a first state to a second state so that the housing is coupled to an external object, an input signal generating device for generating an input signal when the coupling device is changed to the second state, and a control circuit configured to execute at least one instruction on the basis of at least one input signal generated from the input signal generating device.

20 Claims, 29 Drawing Sheets

WEARABLE ELECTRONIC DEVICE AND OPERATING METHOD THEREOF

CROSS-REFERENCE TO RELATED APPLICATION(S)

This application claims the benefit under 35 U.S.C. § 119(a) of a Korean patent application filed on Aug. 9, 2016 in the Korean Intellectual Property Office and assigned Serial number 10-2016-0101172, the entire disclosure of which is hereby incorporated by reference.

TECHNICAL FIELD

The present disclosure relates to a wearable electronic device and an operating method thereof.

BACKGROUND

Various types of wearable electronic devices are being developed. The wearable electronic device can improve portability and user accessibility.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wearable electronic device capable of decreasing a case where the wearable electronic device is shaken or detached in a wearing state, and an operating method thereof.

While the user is moving, the electronic device may be shaken or detached from the user regardless of a user's intention.

In accordance with an aspect of the present disclosure, an electronic device is provided. The electronic device includes a housing having a wearable shape configured to be worn on a human body, a coupling device disposed to at least one area of the housing and changeable from a first state to a second state so that the housing is coupled to an external object, an input signal generating device for generating an input signal when the coupling device is changed to the second state, and a control circuit configured to execute at least one instruction on the basis of at least one input signal generated from the input signal generating device.

In accordance with another aspect of the present disclosure, an operating method of an electronic device comprising a housing having a wearable shape that can configured to be worn on a human body, and a coupling device changeable from a first state to a second state by external force so that an external object can be coupled to the housing is provided. The method includes sensing at least one input signal generated when the coupling device is changed to the second state, activating the electronic device on the basis of at least one part of the at least one input signal, acquiring sensor data from at least one sensor of the electronic device, and reproducing audio data stored in a memory of the electronic device on the basis of at least one part of the sensor data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
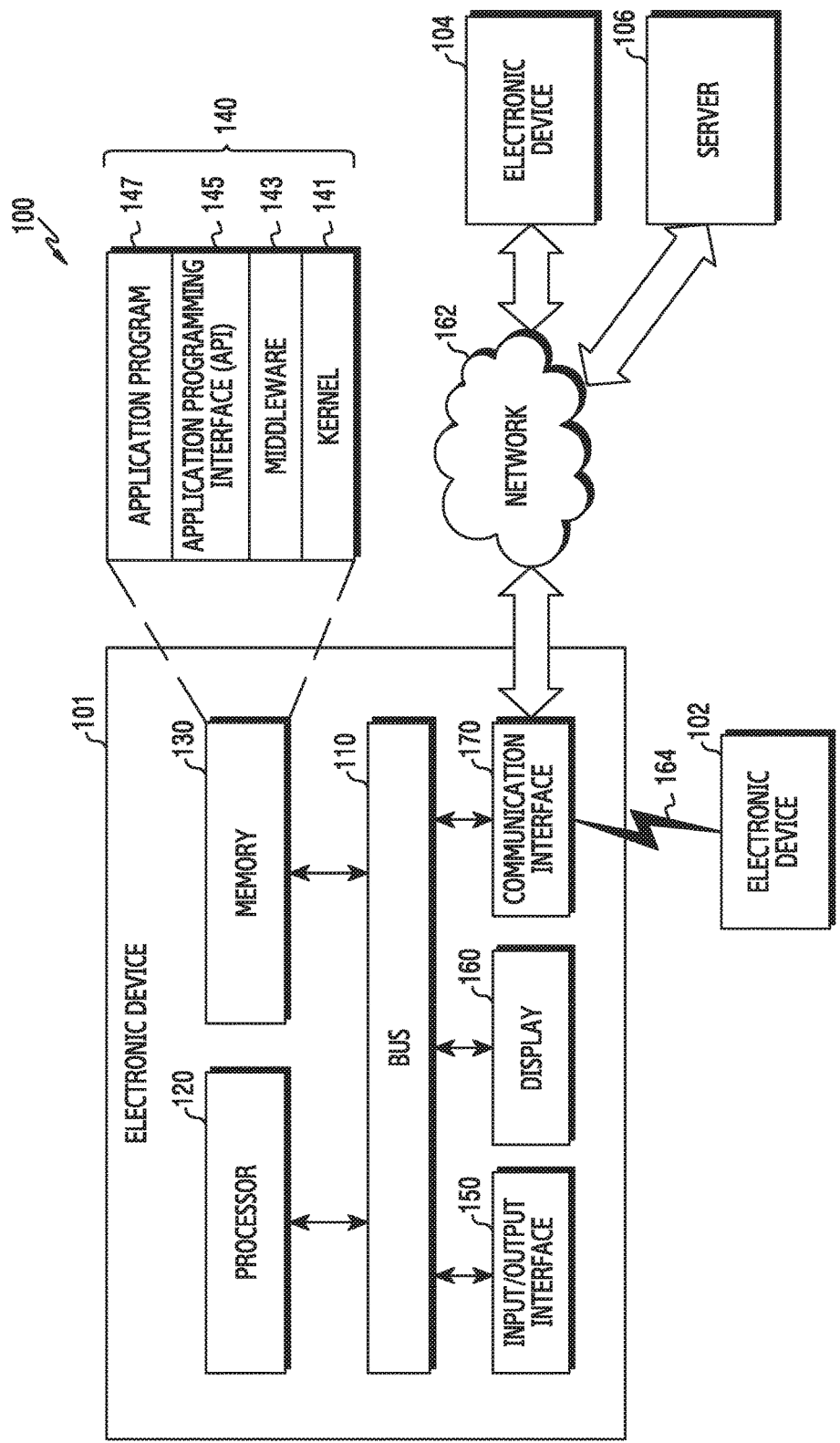
FIG. 1 is a block diagram of a network environment system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression "configured to" used in the present document may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in a memory device.

An electronic device according to various embodiments of the present document may include, for example, at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a MPEG-1 audio layer 3 (MP3) player, a mobile medical device, a camera, and a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit). According to certain embodiments, the electronic device may include, for example, at least one of a television (TV), a digital versatile disc (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, and an electronic picture frame.

According to other embodiments, the electronic device may include at least one of various medical devices (e.g., various portable medical measuring devices (e.g., a blood sugar measuring device, a hear rate measuring device, a blood pressure measuring device, a body temperature measuring device, etc.), magnetic resonance angiography (MRA), magnetic resonance imaging (MRI), computed tomography (CT), imaging equipment, ultrasonic instrument, etc.)), a navigation device, a global positioning system (GPS) receiver, an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of financial institutions, point of sales (POS) of shops, and internet of things (e.g., a light bulb, various sensors, an electric or gas meter, a sprinkler device, a fire alarm, a thermostat, a streetlamp, a toaster, a fitness equipment, a hot water tank, a heater, a boiler, etc.). According to certain embodiments, the electronic device may include at least one of one part of furniture, buildings/constructions or cars, an electronic board, an electronic signature receiving device, a projector, and various measurement machines (e.g., water supply, electricity, gas, propagation measurement machine, etc.). The electronic device according to various embodiments may be flexible, or may be a combination of two or more of the aforementioned various devices. The electronic device according to an embodiment of the present document is not limited to the aforementioned devices. The term 'user' used in the present document may refer to a person who uses the electronic device or a device (e.g., an artificial intelligence (AI) electronic device) which uses the electronic device.

FIG. 1 is a block diagram of a network environment system according to an embodiment of the present disclosure.

Referring to FIG. 1, an electronic device 101 in a network environment 100 is disclosed according to various embodiments. The electronic device 101 may include a bus 110, a processor 120, a memory 130, an input/output interface 150, a display 160, and a communication interface 170. In a certain embodiment, the electronic device 101 may omit at least one of the aforementioned constitutional elements or may additionally include other constitutional elements. The bus 110 may include a circuit for connecting the aforementioned constitutional elements 120, 120, 150, 160 and 170 to each other and for delivering communication (e.g., a control message and/or data) between the aforementioned constitutional elements. The processor 120 may include one or more of a CPU, an application processor (AP), and a communication processor (CP). The processor 120 may control, for example, at least one of other constitutional elements of the electronic device 101 and/or may execute an arithmetic operation or data processing for communication.

The memory 130 may include a volatile and/or non-volatile memory. The memory 130 may store, for example, an instruction or data related to at least one different constitutional element of the electronic device 101. According to an embodiment, the memory 130 may store a software and/or a program 140. The program 140 may include, for example, a kernel 141, a middleware 143, an application programming interface (API) 145, and/or an application program (or an "application") 147, and the like. At least one part of the kernel 141, middleware 143, or API 145 may be referred to as an operating system (OS). The kernel 141 may control or manage, for example, system resources (e.g., the bus 110, the processor 120, the memory 130, etc.) used to execute an operation or function implemented in other programs (e.g., the middleware 143, the API 145, or the application program 147). Further, the kernel 141 may provide an interface capable of controlling or managing the system resources by accessing individual constitutional elements of the electronic device 101 in the middleware 143, the API 145, or the application program 147.

The middleware 143 may perform, for example, a mediation role so that the API 145 or the application program 147 can communicate with the kernel 141 to exchange data. Further, the middleware 143 may handle one or more task requests received from the application program 147 according to a priority. For example, the middleware 143 may assign a priority of using the system resources (e.g., the bus 110, the processor 120, or the memory 130) of the electronic device 101 to at least one of the application programs 147, and may process the one or more task requests. The API 145 may include at least one interface or function (e.g., instruction), for example, for file control, window control, video processing, or character control, as an interface capable of controlling a function provided by the application 147 in the kernel 141 or the middleware 143. For example, the input/output interface 150 may deliver an instruction or data input from a user or a different external device(s) to the different constitutional elements of the electronic device 101, or may output an instruction or data received from the different constitutional element(s) of the electronic device 101 to the different external device.

The display 160 may include various types of displays, for example, a liquid crystal display (LCD) display, a light emitting diode (LED) display, an organic light-emitting diode (OLED) display, a microelectromechanical systems (MEMS) display, or an electronic paper display. The display 160 may display, for example, a variety of contents (e.g., text, image, video, icon, symbol, etc.) to the user. The display 160 may include a touch screen. For example, the display 160 may receive a touch, gesture, proximity, or hovering input by using a stylus pen or a part of a user's body. The communication interface 170 may establish, for example, communication between the electronic device 101 and the external device (e.g., a $1^{st}$ external electronic device 102, a $2^{nd}$ external electronic device 104, or a server 106). For example, the communication interface 170 may communicate with the external device (e.g., the $2^{nd}$ external electronic device 104 or the server 106) by being connected with a network 162 through wireless communication or wired communication.

For example, the wireless communication may use at least one of long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), and the like. According to an embodiment, as described above by taking an element 164 of FIG. 1 for example, the wireless communication may include at least one of wireless fidelity (WiFi), Bluetooth, Bluetooth low energy (BLE), Zigbee, near field communication (NFC), magnetic secure transmission, Radio Frequency (RF), and body area network (BAN). According to an embodiment, the wireless communication may include a global navigation satellite system (GNSS). The GNSS may be, for example, a GPS, a global navigation satellite system (Glonass), a Beidou Navigation Satellite System (hereinafter, "Beidou") or Galileo, the European global satellite-based navigation system. Hereinafter, the "GPS" and the "GNSS" may be used interchangeably in the present document. The wired communication may include, for example, at least one of universal serial bus (USB), high definition multimedia interface (HDMI), recommended standard-232 (RS-232), power-line communication, plain old telephone service (POTS), and the like. The network 162 may include, for example, at least one of a telecommunications network, a computer network (e.g., LAN or WAN), the Internet, and a telephone network.

Each of the $1^{st}$ and $2^{nd}$ external electronic devices 102 and 104 may be the same type or different type of the electronic device 101. According to various embodiments, all or some of operations executed by the electronic device 101 may be executed in a different one or a plurality of electronic devices (e.g., the electronic device 102 or 104 or the server 106). According to an embodiment, if the electronic device 101 needs to perform a certain function or service either automatically or at a request, the electronic device 101 may request at least a part of functions related thereto alternatively or additionally to a different electronic device (e.g., the electronic device 102 or 104 or the server 106) instead of executing the function or the service autonomously. The different electronic device (e.g., the electronic device 102 or 104 or the server 106) may execute the requested function or additional function, and may deliver a result thereof to the electronic device 101. The electronic device 101 may provide the requested function or service either directly or by additionally processing the received result. For this, for example, a cloud computing, distributed computing, or client-server computing technique may be used.

Figure 2:
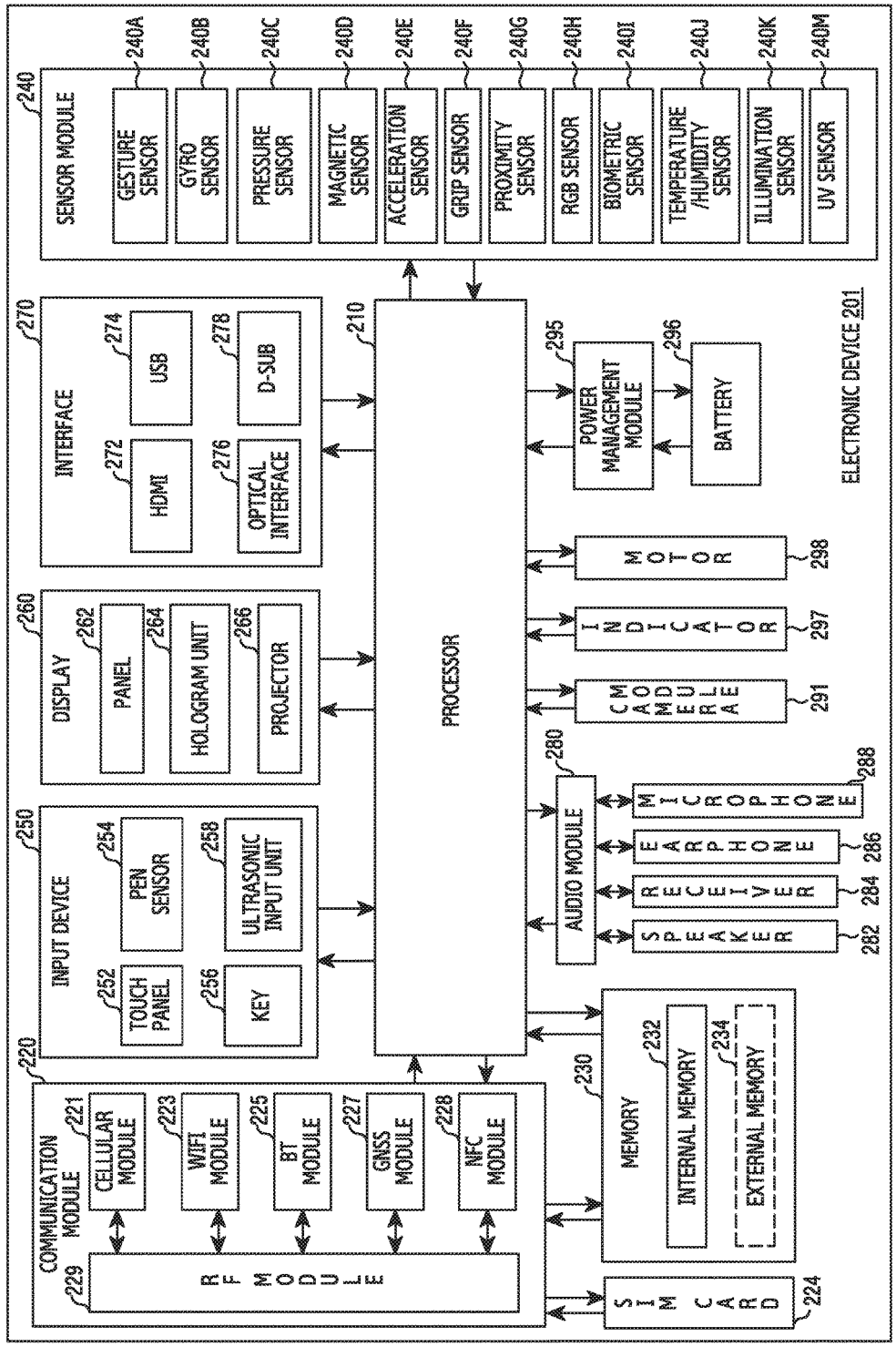
FIG. 2 is a block diagram of an electronic device according to an embodiment of the present disclosure.

FIG. 2 is a block diagram of an electronic device according to various embodiments of the present disclosure.

Referring to FIG. 2, an electronic device 201 may include, for example, all or some parts of the electronic device 101 of FIG. 1. The electronic device 201 may include one or more processors (e.g., APs) 210, a communication module 220, a subscriber identity module 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software constitutional elements connected to the processor 210 by driving, for example, an operating system or an application program, and may process a variety of data including multimedia data and may perform an arithmetic operation. The processor 210 may be implemented, for example, with a system on chip (SoC). According to an embodiment, the processor 210 may further include a graphic processing unit (GPU) and/or an image signal processor. The processor 210 may include at least one part (e.g., a cellular module 221) of the aforementioned constitutional elements of FIG. 2. The processor 210 may process an instruction or data, which is received from at least one of different constitutional elements (e.g., a non-volatile memory), by loading it to a volatile memory and may store a variety of data in the non-volatile memory.

The communication module 220 may have a structure the same as or similar to, for example, the communication interface 170. The communication module 220 may include, for example, the cellular module 221, a Wi-Fi module 223, a BlueTooth (BT) module 225, a GNSS module 227, a near field communication (NFC) module 228, and a radio frequency (RF) module 229. The cellular module 221 may provide a voice call, a video call, a text service, an Internet service, or the like, for example, through a communication network. According to an embodiment, the cellular module 221 may identify and authenticate the electronic device 201 in the communication network by using the subscriber identity module (e.g., the subscriber identity module (SIM) card) 224. According to an embodiment, the cellular module 221 may perform at least some functions that can be provided by the processor 210. According to an embodiment, the cellular module 221 may include a communication processor (CP). According to an embodiment, at least some (e.g., two or more) of the cellular module 221, the WiFi module 223, the BT module 225, the GPS module 227, and the NFC module 228 may be included in one integrated chip (IC) or IC package. The RF module 229 may transmit/receive, for example, a communication signal (e.g., a RF signal). The RF module 229 may include, for example, a transceiver, a power amp module (PAM), a frequency filter, a low noise amplifier (LNA), an antenna, or the like. According to another embodiment, at least one of the cellular module 221, the WiFi module 223, the BT module 225, the GPS module 227, and the NFC module 228 may transmit/receive an RF signal via a separate RF module. The subscriber identity module 224 may include, for example, a card including the subscriber identity module and/or an embedded SIM, and may include unique identification information (e.g., an integrated circuit card IDentifier (ICCID)) or subscriber information (e.g., an international mobile subscriber identity (IMSI)).

The memory 230 (e.g., the memory 130) may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), etc.) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.), a hard drive, or a solid state drive (SSD)). The external memory 234 may further include a flash drive, for example, compact flash (CF), secure digital (SD), micro secure digital (Micro-SD), mini secure digital (Mini-SD), extreme Digital (xD), memory stick, or the like. The external memory 234 may be operatively and/or physically connected to the electronic device 201 via various interfaces.

The sensor module 240 may measure, for example, physical quantity or detect an operational status of the electronic device 201, and may convert the measured or detected information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a red, green, blue (RGB) sensor), a bio sensor 240I, a temperature/humidity sensor 240J, an illumination sensor 240K, and an ultra violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. In a certain embodiment, the electronic device 201 may further include a processor configured to control the sensor module 204 either separately or as one part of the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may recognize a touch input, for example, by using at least one of an electrostatic type, a pressure-sensitive type, and an ultrasonic type. In addition, the touch panel 252 may further include a control circuit. The touch penal 252 may further include a tactile layer and thus may provide the user with a tactile reaction. The (digital) pen sensor 254 may be, for example, one part of a touch panel, or may include an additional sheet for recognition. The key 256 may be, for example, a physical button, an optical key, a keypad, or a touch key. The ultrasonic input device 258 may detect an ultrasonic wave generated from an input means through a microphone (e.g., a microphone 288) to confirm data corresponding to the detected ultrasonic wave.

The display 260 (e.g., the display 160) may include a panel 262, a hologram unit 264, a projector 266, and/or a control circuit for controlling these elements. The panel 262 may be implemented, for example, in a flexible, transparent, or wearable manner. The panel 262 may be constructed as one module with the touch panel 252. According to an embodiment, the panel 262 may include a pressure sensor (or a force sensor) capable of measuring strength of pressure for a user's touch. The pressure sensor may be implemented in an integral form with respect to the touch panel 252, or may be implemented as one or more sensors separated from the touch panel 252. The hologram unit 264 may use an interference of light and show a stereoscopic image in the air. The projector 266 may display an image by projecting a light beam onto a screen. The screen may be located, for example, inside or outside the electronic device 201. The interface 270 may include, for example, a HDMI 272, a USB 274, an optical communication interface 276, or a D-subminiature (D-sub) 278. The interface 270 may be included, for example, in the communication interface 170 of FIG. 1. Additionally or alternatively, the interface 270 may include, for example, a mobile high-definition link (MHL) interface, a SD/multi-media card (MMC) interface, or an Infrared Data Association (IrDA) standard interface.

The audio module 280 may bilaterally convert, for example, a sound and electric signal. At least some constitutional elements of the audio module 280 may be included in, for example, the input/output interface 150 of FIG. 1. The audio module 280 may convert sound information which is input or output, for example, through a speaker 282, a receiver 284, an earphone 286, the microphone 288, or the like. The camera module 291 is, for example, a device for image and video capturing, and according to an embodiment, may include one or more image sensors (e.g., a front sensor or a rear sensor), a lens, an image signal processor (ISP), or a flash (e.g., LED or xenon lamp). The power management module 295 may manage, for example, power of the electronic device 201. According to an embodiment, the power management module 295 may include a power management integrated circuit (PMIC), a charger integrated circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. The battery gauge may measure, for example, residual quantity of the battery 296 and voltage, current, and temperature during charging. The battery 296 may include, for example, a rechargeable battery and/or a solar battery.

The indicator 297 may display a specific state, for example, a booting state, a message state, a charging state, or the like, of the electronic device 201 or one part thereof (e.g., the processor 210). The motor 298 may convert an electric signal into a mechanical vibration, and may generate a vibration or haptic effect. The electronic device 201 may include a mobile TV supporting device (e.g., a GPU) capable of processing media data according to a protocol of, for example, digital multimedia broadcasting (DMB), digital video broadcasting (DVB), MediaFlo™, or the like. Each of constitutional elements described in the present document may consist of one or more components, and names thereof may vary depending on a type of an electronic device. In various embodiments, the electronic device (e.g., the electronic device 201) may be configured such that some of the constitutional elements are omitted, or additional other constitutional elements are further included, or some of the constitutional elements are combined and constructed as one entity, so as to equally perform functions of corresponding constitutional elements before combination.

Figure 3:
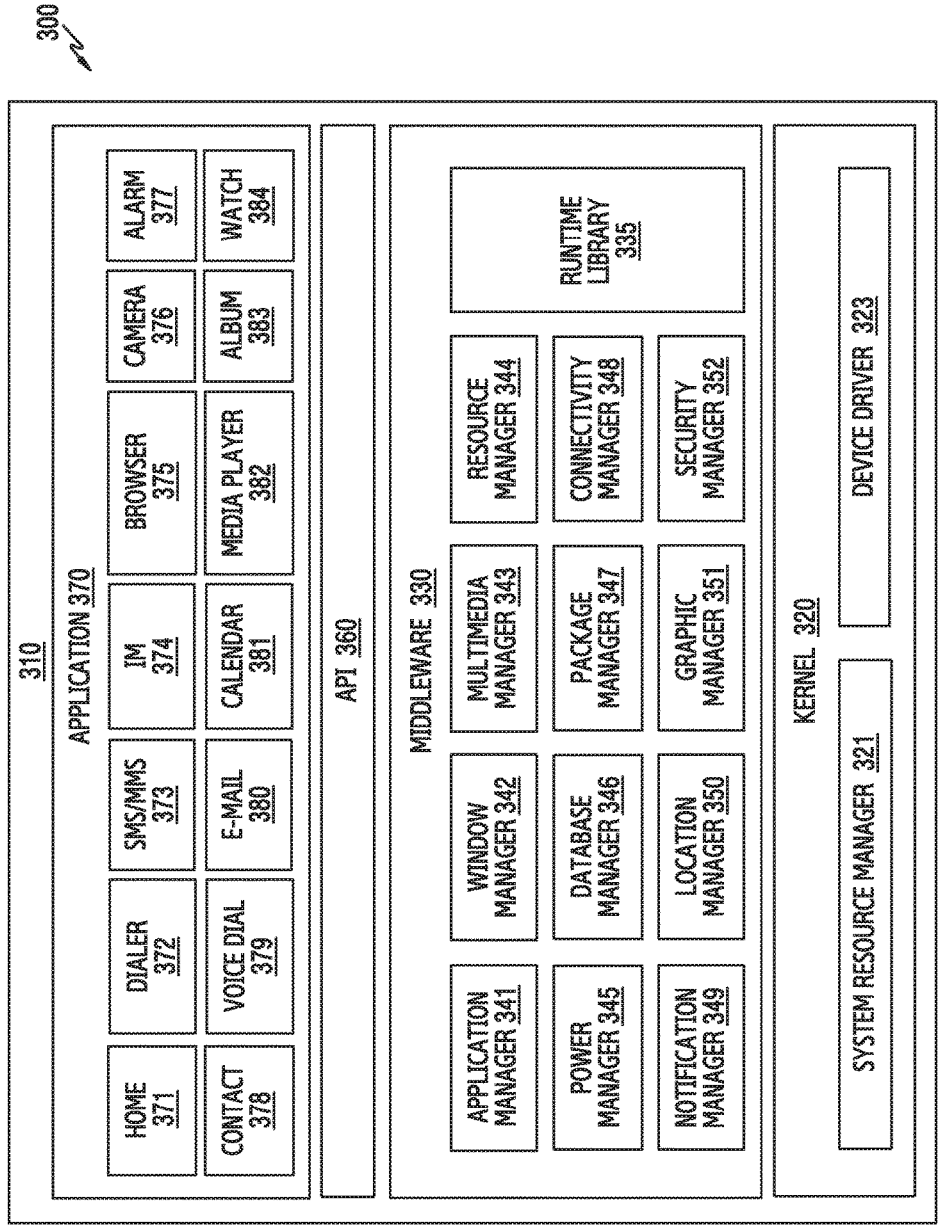
FIG. 3 is a block diagram of a program module according to an embodiment of the present disclosure.

FIG. 3 is a block diagram 300 of a program module according to an embodiment of the present disclosure.

Referring to FIG. 3, a program module 310 (e.g., the program 140) may include an OS for controlling a resource related to an electronic device (e.g., the electronic device 101 or 201) and/or various applications (e.g., the application 147) driven on the OS. The OS may be, for example, Android™, iOS™, Windows™ Symbian™, Tizen™, or Bada™. Referring to FIG. 3, the program module 310 may include a kernel 320 (e.g., the kernel 141), a middleware 330 (e.g., the middleware 143), an API 360 (e.g., the API 145), and/or an application 370 (e.g., the application 147). At least one part of the program module 310 can be preloaded on the electronic device, or can be downloaded from an external device (e.g., the external electronic device 102 or 104, the server 106, etc.).

The kernel 320 may include, for example, a system resource manager 321 and/or a device driver 323. The system resource manager 321 may perform control, allocation, retrieval, or the like of the system resource. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may provide, for example, a function commonly required by the application 370, or may provide various functions through the API 360 so that the application 370 can effectively use a limited system resource in the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the application 370 is executed. The runtime library 335 may perform an operation of an input/output management, a memory management, an arithmetic function, or the like. The application manager 341 may manage, for example, a life cycle of the applications 370. The window manager 342 may manage a graphic user interface (GUI) resource used in a screen. The multimedia manager 343 may recognize a format required to reproduce various media files, and may use a codec suitable for the format to perform encoding or decoding of the media file. The resource manager 344 may manage a source code or memory space of the applications 370. The power manager 345 may manage, for example, a battery capacity or power, and may provide power information required for the operation of the electronic device. According to an embodiment, the power manager 345 may interwork with a basic input/output system (BIOS). The database manager 346 may generate, search, or change a database to be used, for example, in the application 370. The package manager 347 may manage an installation or update of an application distributed in a form of a package file.

The connectivity manager 348 may manage, for example, a wireless connection. The notification manager 349 may provide an event such as an incoming message, an appointment, a proximity notification, or the like to the user. The location manager 350 may manage, for example, location information of the electronic device. The graphic manager 351 may manage, for example, a graphic effect to be provided to the user or a user interface related thereto. The security manager 352 may provide, for example, system security or user authentication. According to an embodiment, the middleware 330 may include a telephony manager for managing a voice or video telephony function of the electronic device or a middleware module capable of forming a combination of functions of the aforementioned constitutional elements. According to an embodiment, the middleware 330 may provide a module specified for each type of operating system. The middleware 330 may dynamically delete some of the existing constitutional elements or may add new constitutional elements. The API 360 is, for example, a set of API programming functions, and may be provided with other configurations according to an operating system. For example, in case of Android or iOS, one API set may be provided for each platform, and in case of Tizen, two or more API sets may be provided.

The application 370 may include, for example, an application for providing a home 371, a dialer 372, a short message service (SMS)/multimedia messaging service (MMS) 373, an instant message (IM) 374, a browser 375, a camera 376, an alarm 377, a contact 378, a voice dial 379, an e-mail 380, a calendar 381, a media player 382, an album 383, a clock 384, a health care (e.g., an application for measuring a physical activity level, a blood sugar level, etc.), or environment information (e.g., atmospheric pressure, humidity, or temperature information). According to an embodiment, the application 370 may include an information exchange application capable of supporting information exchange between the electronic device and the external electronic device. The information exchange application may include, for example, a notification relay application for delivering specific information to the external electronic device or a device management application for managing the external electronic device. For example, the notification relay application may deliver notification information generated in another application of the electronic device to the external electronic device, or may receive the notification information from the external electronic device and provide it to the user. The device management application may install, delete, or update, for example, a function of the external electronic device communicating with the electronic device (e.g., turn-on/turn-off or display brightness (or resolution) adjustment of the external electronic device itself (or some constitutional elements)), or an application operating in the external electronic device. According to an embodiment, the application 370 may include an application (e.g., a health management application of a mobile medical device) designated based on an attribute of the external electronic device. According to an embodiment, the application 370 may include an application received from the external electronic device. At least some parts of the programming module 310 may be implemented (e.g., executed) with software, firmware, hardware (e.g., the processor 210), or at least two or more combinations thereof, and may include modules, programs, routines, sets of instructions, processes, or the like for performing one or more functions.

A term "module" used in the present document includes a unit consisting of hardware, software, or firmware, and may be interchangeably used with a term such as a logic, a logical block, a component, a circuit, and the like. The "module" may be a minimum unit of an integrally constituted component or a minimum unit for performing one or more functions or a part thereof. The "module" may be mechanically or electrically implemented. For example, the "module" may include an application-specific integrated circuit (ASIC) chip, a field-programmable gate arrays (FPGAs), and a programmable-logic device, which perform certain operations and which are known or will be developed. According to various embodiments, at least some parts of a device (e.g., modules or functions thereof) or method (e.g., operations) may be implemented with an instruction stored in a computer-readable storage media (e.g., the memory 130). If the instruction is executed by one or more processors (e.g., the processor 120), the processor may perform a function corresponding to the instruction. The computer readable recording medium may include a hard disk, a floppy disk, a magnetic medium (e.g., a magnetic tape), an optical storage medium (e.g., a compact disc-ROM (CD-ROM) or a DVD, a magnetic-optic medium such as a floptical disc), an internal memory, or the like. The instruction may include a code created by a compiler or a code executable by an interpreter. The module or programming module according to various embodiments may further include at least one or more constitutional elements among the aforementioned constitutional elements, or may omit some of them, or may further include other constitutional elements. Operations performed by a module, programming module, or other constitutional elements according to various embodiments may be executed in a sequential, parallel, repetitive, or heuristic manner. Alternatively, at least some of the operations may be executed in a different order or may be omitted, or other operations may be added.

Figure 4:
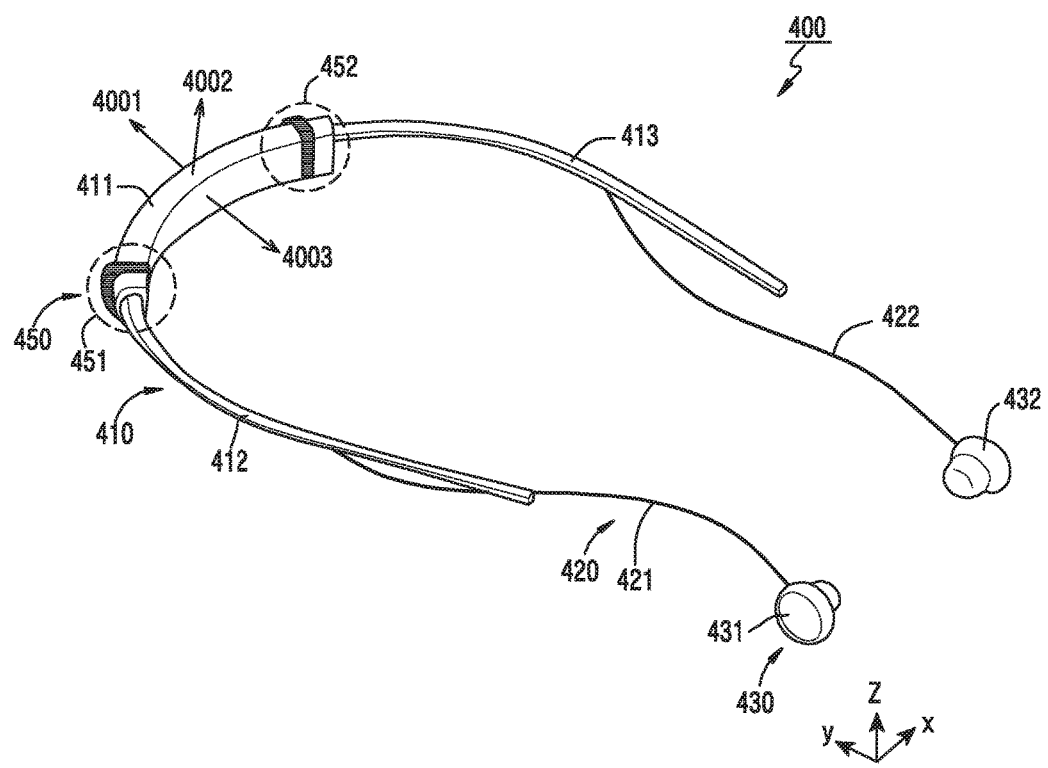
FIGS. 4 and 5 illustrate an electronic device according to an various embodiments of the present disclosure.
Figure 5:
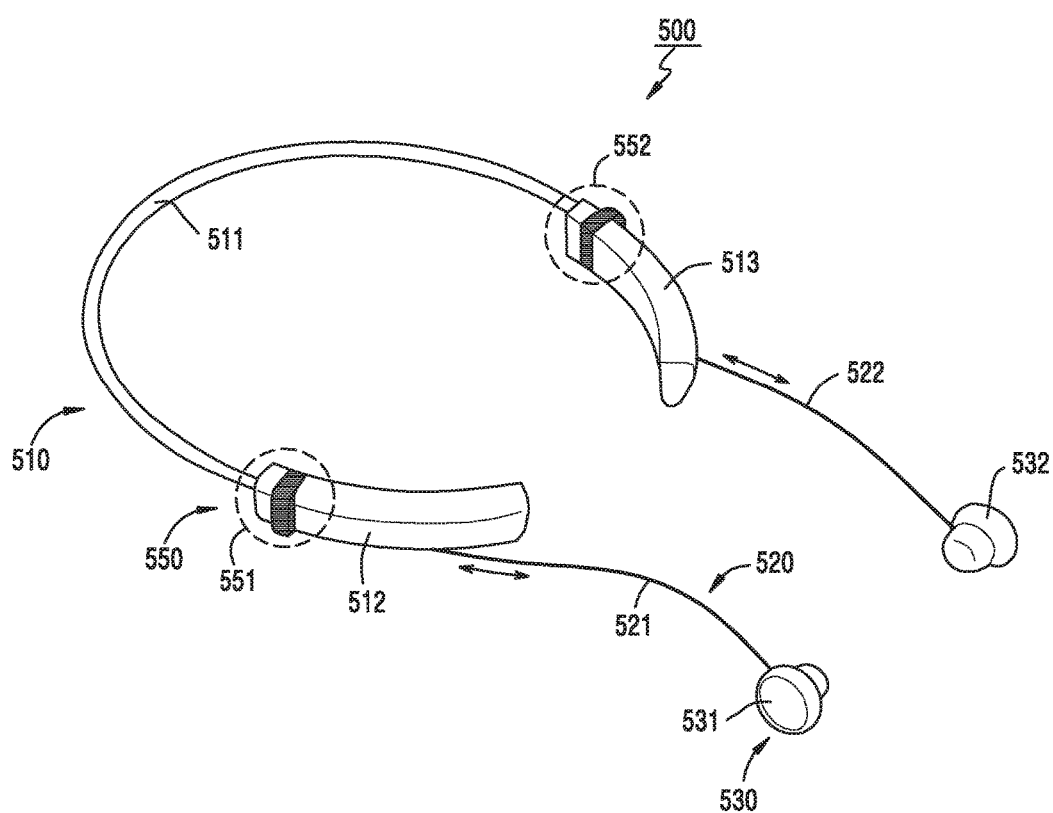

FIGS. 4 and 5 illustrate an electronic device according to various embodiments of the present disclosure.

Figure 6:
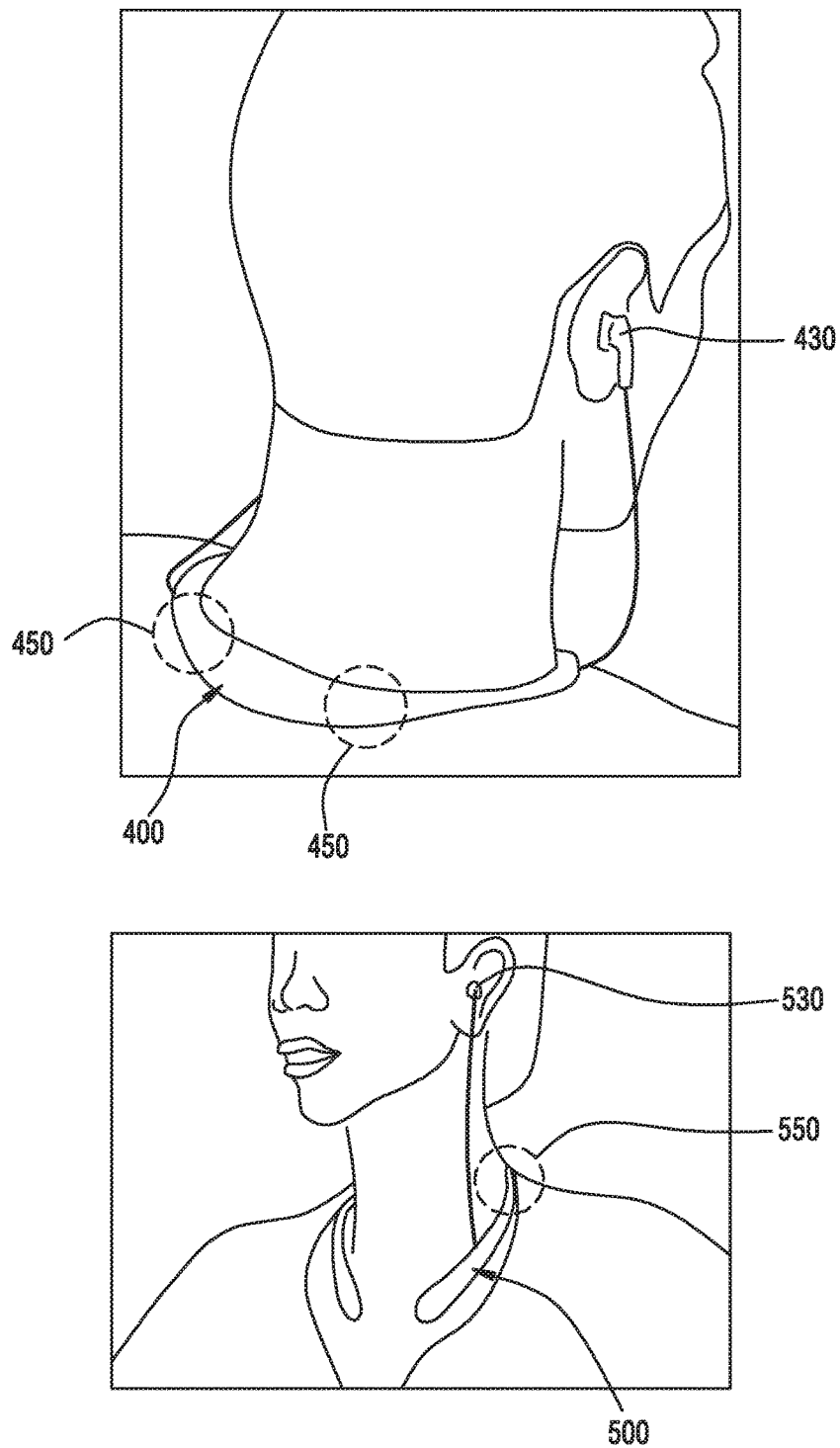
FIG. 6 illustrates a state where a user wears an electronic device according to an embodiment of the present disclosure.

FIG. 6 illustrates a state where a user wears an electronic device according to an embodiment of the present disclosure.

FIGS. 7A to 7D illustrate a coupling device according to various embodiments of the present disclosure. According to various embodiments, an electronic device may include all or some parts of the electronic device 101 of FIG. 1 or the electronic device 201 of FIG. 2.

Referring to FIG. 4, an electronic device 400 may include a housing 410, a cable 420, a speaker 430, and a coupling device 450.

According to an embodiment, the housing 410 may have a substantially curved shape extended from one end portion to the other end portion. For example, as illustrated, the housing 410 may be designed in a form of a neck bend that can be worn on a user's neck.

According to an embodiment, the housing 410 may include a first housing 411, a second housing 412, and a third housing 413. The first housing 411 may connect between the second housing 412 and the third housing 413. For example, one end portion of the first housing 411 may be connected to the second housing 412, and the other end portion of the first housing 411 may be connected to the third housing 413. One end portion of the second housing 412 may be connected to the first housing 411, and the other end portion of the second housing 412 may be a free end. One end portion of the third housing 413 may be connected to the first housing 411, and the other end portion of the third housing 413 may be a free end.

According to an embodiment, when the housing 410 is worn on the user's neck, the first housing 411 may be disposed to a rear portion of the user's neck, and the second housing 412 and the third housing 413 may be disposed respectively to both lateral portions of the user's neck.

According to an embodiment, the first housing 411 may be thicker than the second housing 412 or the third housing 413 when viewed from cross-section along a length extended from one end portion to the other end portion. For example, the second housing 412 and the third housing 413 may be disposed to be symmetrical to each other, and may have a thickness thinner than that of the first housing 411. The second housing 412 and the third housing 413 may have an elastically changeable shape, which may facilitate the wearing of the housing 410 on the user's neck.

The electronic device 400 may include various electronic components (not shown) (e.g., a processor, a memory, a sensor, an input device, a display, a battery, an indicator, a motor, etc.) installed in the housing 410 (e.g., the first housing 411).

The cable 420 may include a first cable 421 extended from the second housing 412 and a second cable 422 extended from the third housing 413.

The speaker 430 may include a first speaker 431 connected to the first cable 421 and a second speaker 432 connected to the second cable 422. The speaker 430 may be electrically connected to a circuit included in the housing 410 through the cable 420.

Referring to FIG. 6, the speaker 430 may be an earphone that can be worn on a user's ear.

According to an embodiment, the coupling device 450 may be coupled to the housing 410, and may be used to mechanically couple the electronic device 400 to an external object. Referring to FIG. 6, when the housing 410 is worn on the user's neck, the coupling device 450 may be used to couple it to a clothing around the user's neck. Assuming that the coupling device 450 is not applied, the electronic device 400 may be detached from the user's neck or shaken on the user's neck when the user is running or exercising intensely. According to an embodiment, the coupling device 450 may prevent the electronic device 400 from being detached from the user's neck or being shaken on the user's neck.

According to an embodiment, at least one coupling device 450 may be disposed in the first housing 411. For example, a pair of coupling devices 450 may be disposed to the first housing 411. The pair of coupling devices 450 may include a first coupling device 451 disposed to a portion adjacent to the second housing 412 and a second coupling device 452 disposed to a portion adjacent to the third housing 413.

Referring to FIGS. 7A to 7D, the coupling device 450 according to an embodiment may include a first portion 701 and second portion 702 of the housing 410, and a moving member 710. The first portion 701 and second portion 702 of the housing 410 may be connected by means of a connection portion 705. When viewed in cross-section, the first portion 701 and the second portion 702 may be substantially similar, or may have the same cross-sectional shape. The connection portion 705 may be relatively thinner than the first portion 701 and the second portion 702 of the housing 410. The first portion 701 is separated from the second portion 702 by a pre-designed distance 704, and a space 703 may be formed between the first portion 701 and the second portion 702.

When viewed in cross-section, the housing 410 may have various shapes (e.g., a rectangular shape, a triangular shape, a circular shape, etc.). According to an embodiment, as illustrated, the housing 410 may have a substantially triangular cross-section. For example, the housing 410 may include a first surface 410a, a second surface 410b, and a third surface 410c. The first surface 410a may include a surface substantially facing an outer direction (hereinafter referred to as a first direction) 4001 of the curved housing 410. The third surface 410c may include a surface substantially facing an inner direction (hereinafter referred to as a third direction) 4003 of the curved housing 410. The second surface 410b is a portion forming an outer surface of the housing 410 together with the first surface 410a and the third surface 410c and may substantially face a second direction 4002. According to an embodiment, the second direction 4002 and the third direction 4003 may be substantially orthogonal.

According to an embodiment, the moving member 710 may have a substantially inverted 'U' shape. For example, when viewed in cross-section, the moving member 710 may include a first extension portion 711, a second extension portion 712, and a third extension portion 713. The first extension portion 711 and the third extension portion 713 may be separated from each other, and the second extension portion 712 may connect the first extension portion 711 and the third extension portion 713. One end portion of the first extension portion 711 may be connected to the second extension portion 712, and the other end portion of the first extension portion 711 may be a free end. The third extension portion 713 may be connected to the second extension portion 712, and the other end portion of the third extension portion 713 may be a free end.

The moving member 710 may include a space 714 surrounded by the first extension portion 711, the second extension portion 712, and the third extension 713. When the moving member 710 is coupled to the housing 410, the connection portion 705 of the housing 410 may be disposed to the space 714 of the moving member 710.

Figure 7A:
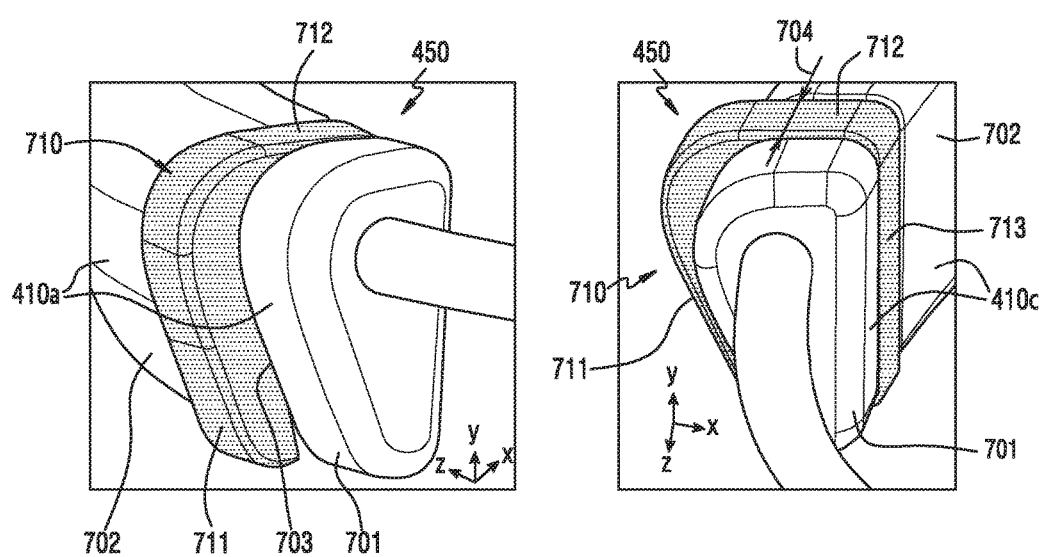
FIGS. 7A, 7B, 7C and 7D illustrate a coupling device according to various embodiments of the present disclosure.
Figure 7B:
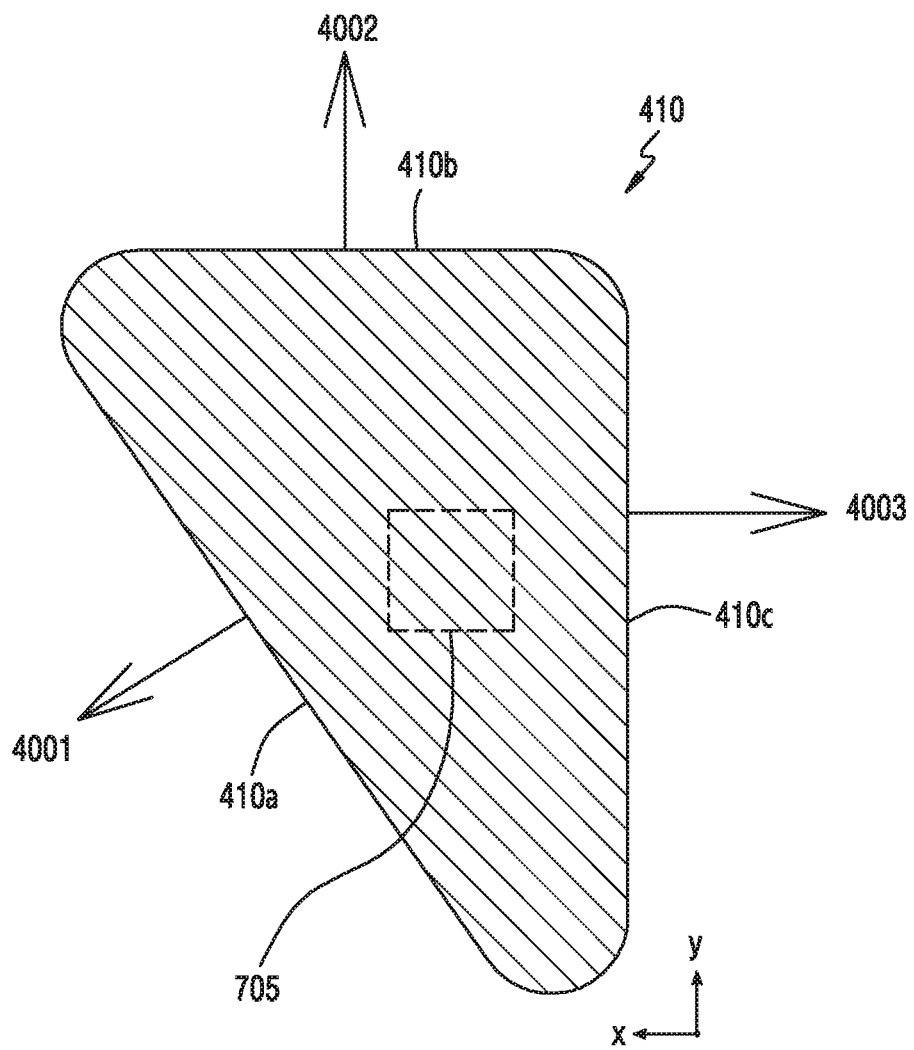
Figure 7C:
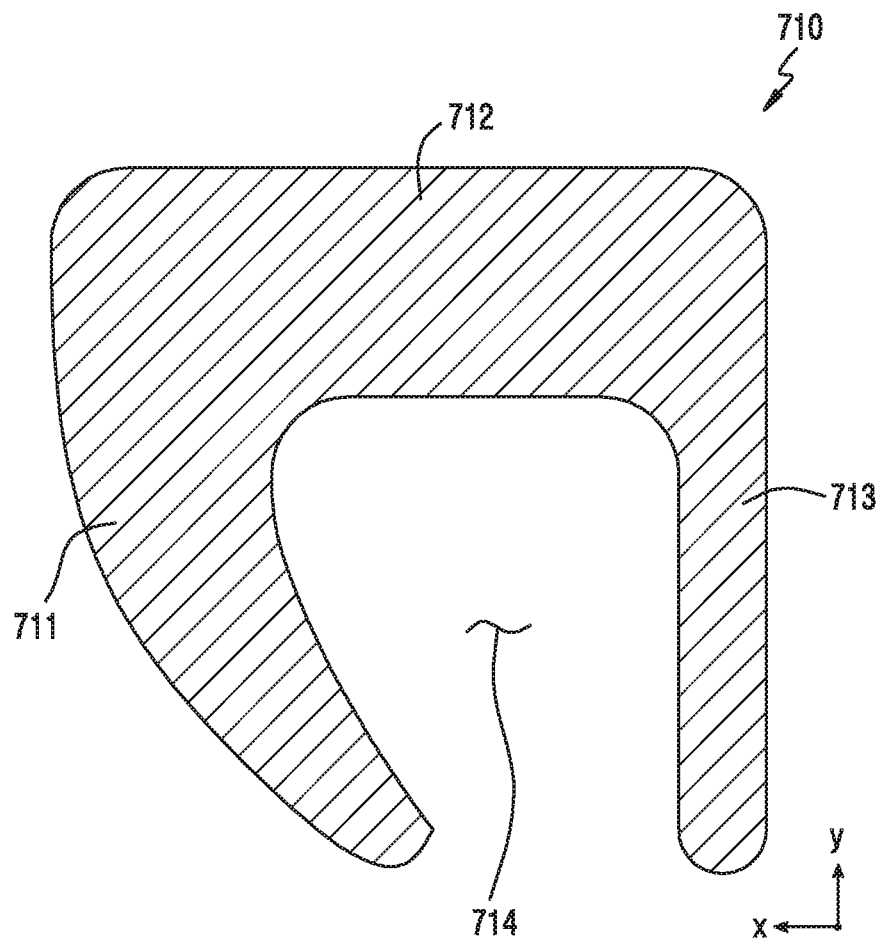

Referring to FIG. 7A, a first state where the moving member 710 is not moved is illustrated. In the first state, the first extension portion 711 of the moving member 710 may relatively protrude with respect to the first surface 410a of the housing 410. Alternatively, in the first state, the third extension portion 713 of the moving member 710 may not relatively protrude with respect to the third surface 410c of the housing 410.

Figure 7D:
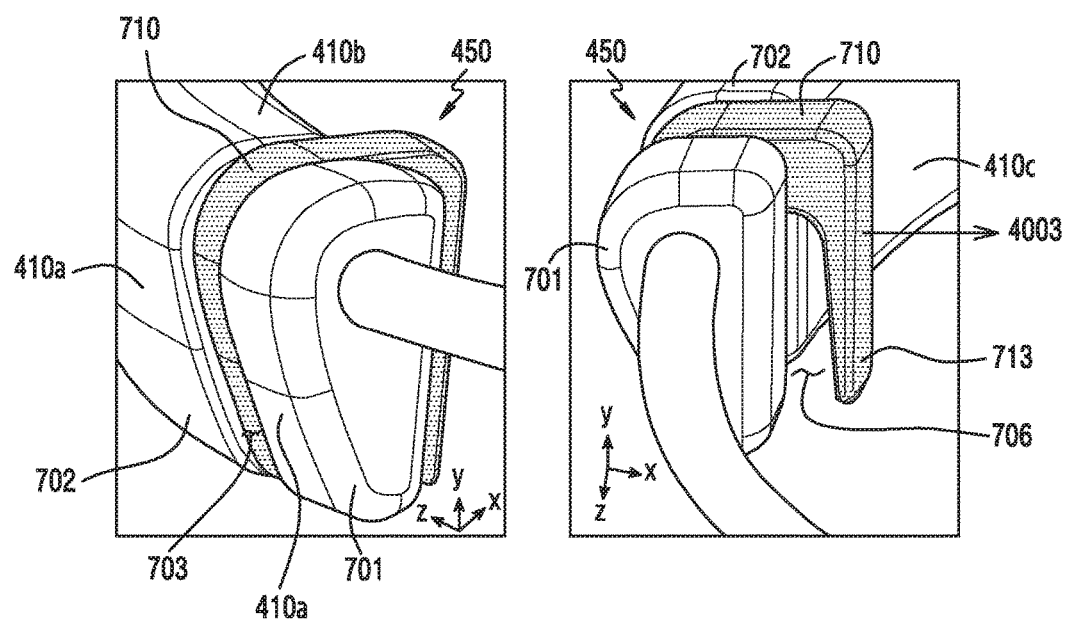

Referring to FIG. 7D, a second state where the moving member 710 is moved is illustrated. For example, the moving member 710 may be moved in the third direction 4003. In the second state, the first extension portion 711 of the moving member 710 may not relatively protrude with respect to the first surface 410a of the housing 410. In the second state, the third extension 713 of the moving member 710 may relatively protrude with respect to the third surface 410c of the housing 410. According to an embodiment, in the second state, an external object (e.g., a user's clothing) can be coupled in the space 706 between the housing 410 and the third extension portion 713 of the moving member 710.

According to an embodiment, in the second state, a distance by which the moving member 710 is moved may be various depending on a thickness of the external object.

Referring to FIG. 5, an electronic device 500 having a shape different from that of the electronic device 400 of FIG. 4 is illustrated. The electronic device 500 may include a housing 510, a cable 520, a speaker 530, and a coupling device 550.

According to an embodiment, the housing 510 may have a substantially curved shape extended from one end portion to the other end portion. For example, as illustrated, the housing 510 may be designed in a form of a neck bend that can be worn on a user's neck.

According to an embodiment, the housing 510 may include a first housing 511, a second housing 512, and a third housing 513. The first housing 511 may connect between the second housing 512 and the third housing 513. For example, one end portion of the first housing 511 may be connected to the second housing 512, and the other end portion of the first housing 511 may be connected to the third housing 513. One end portion of the second housing 512 may be connected to the first housing 511, and the other end portion of the second housing 512 may be a free end. One end portion of the third housing 513 may be connected to the first housing 511, and the other end portion of the third housing 513 may be a free end.

According to an embodiment, when the housing 510 is worn on the user's neck, the first housing 511 may be disposed to a rear portion of the user's neck, and the second housing 512 and the third housing 513 may be disposed respectively to both lateral portions of the user's neck.

According to an embodiment, the first housing 511 may have a thickness thinner than that of the second housing 512 or the third housing 513 when viewed from cross-section along a length extended from one end portion to the other end portion. The first housing 511 may have an elastically changeable shape, which may facilitate the wearing of the housing 510 on the user's neck.

The electronic device 500 may include various electronic components (not shown) (e.g., a processor, a memory, a sensor, an input device, a display, a battery, an indicator, a motor, etc.) installed in the housing 510 (e.g., the second housing 512 or the third housing 513).

The cable 520 may include a first cable 521 extended from the second housing 512 and a second cable 522 extended from the third housing 513.

The speaker 530 may include a first speaker 531 connected to the first cable 521 and a second speaker 532 connected to the second cable 522. The speaker 530 may be electrically connected to a circuit included in the housing 510 through the cable 520. Referring to FIG. 6, the speaker 530 may be an earphone that can be worn on a user's ear.

According to an embodiment, the electronic device 500 may include a coiling device (not shown) included in the second housing 512. In addition, the electronic device 500 may include a coiling stop device (not shown) included in the second housing 512. For example, if the first cable 521 is pulled out from the second housing 512 by external force, the first cable 521 may be extracted from the second housing 512. Even if the external force is removed, the first cable 521 may remain in a state of being extracted from the second housing 512 by means of the coiling stop device. When a button disposed to the second housing 512 is pressed, the coiling stop device may be in a disable state, and the coiling device may be inserted into the second housing 512 by turning and winding the first cable 521. Regarding the second cable 522, the coiling device and the coiling stop device may be installed in the third housing 513.

According to various embodiments, the second housing 512 may include a groove capable of accommodating at least one part of the first speaker 531. For example, when the first cable 521 is inserted into the second housing 512, the first speaker 531 connected to the first cable 521 may be disposed to the groove of the second housing 512. Regarding the second speaker 532, the third housing 513 may include a groove capable of accommodating at least one part of the second speaker 532.

According to various embodiments, the electronic device 400 of FIG. 4 may also include a device for extracting or inserting the cable 420 from or to the housing 410 similarly to the electronic device 500 of FIG. 5.

According to an embodiment, the coupling device 550 may be coupled to the housing 510, and may be used to mechanically couple the electronic device 500 to an external object. For example, referring to FIG. 6, when the housing 510 is worn on the user's neck, the coupling device 550 may be used to couple it to a clothing around the user's neck. The coupling device 550 may prevent the electronic device 500 worn on the user's neck from being shaken or being detached from the user's neck.

According to an embodiment, at least one coupling device 550 may be disposed to at least one of the second housing 512 and the third housing 513. For example, the coupling device 550 may include a first coupling device 551 disposed to the second housing 512 and a second coupling device 552 disposed to the third housing 513. According to various embodiments, at least one coupling device 550 may include all or some parts of FIG. 7A to FIG. 7D.

According to an embodiment, the electronic device (e.g., 400 of FIG. 4 or 500 of FIG. 5) may include an input device (not shown) which generates a signal in a state where the coupling device 450 or 550 is mechanically coupled to the external object (e.g., a user's clothing). For example, the input device may include a first contact and second contact coupled to the coupling device 450 or 550. When the coupling device 450 or 550 is changed from a first state of being difficult to be coupled to the external object to a second state of being mechanically coupled to the external object, the first contact and second contact of the input device may be electrically connected to each other. An input signal may be generated through the electrical connection between the first contact and second contact of the input device.

According to various embodiments, the input device using the coupling device (e.g., 450 of FIG. 4 or 550 of FIG. 5) may generate various types of a user input signal which triggers instructions of the electronic device 400 or 500 together with a button, a touch pad, or the like. For example, in a state where the electronic device 400 or 500 is not worn on the user's neck, the coupling device (e.g., 450 of FIG. 4 or 550 of FIG. 5) may be changed two times from the first state to the second state within a time which is pre-set by the user. In this case, the user may indicate a user's intention for manipulating the electronic device 400 or 500 in a state where the electronic device 400 or 500 is not worn on the user.

According to various embodiments, the electronic device (e.g., 400 of FIG. 4 or 500 of FIG. 5) may include a control circuit (not shown) (e.g., 210 of FIG. 2) included in the housing 410 or 510 and electrically connected to the input device which uses the coupling device 450 or 550. The control circuit may execute at least one instruction on the basis of at least one part of at least one input signal generated from the input device which uses the coupling device 450 or 550.

According to various embodiments, the control circuit may execute various instructions on the basis of not only at least one user input signal generated from the input device which uses the coupling device (e.g., 450 of FIG. 4 or 550 of FIG. 5) but also sensor data from at least one sensor installed in the electronic device (e.g., 400 of FIG. 4 or 500 of FIG. 5). For example, the control circuit may execute various instructions on the basis of sensor data including motion information of the electronic device 400 or 500, user's biometric information (e.g., heart rate), or the like.

According to various embodiments, the electronic device (e.g., 400 of FIG. 4 or 500 of FIG. 5) may further include a sensor (e.g., a hall sensor, etc.) for outputting a signal indicating a state where the cable 420 or 520 is extracted. The control circuit may execute various instructions on the basis of an input signal generated from the sensor. The state where the cable 420 or 520 is extracted may include a user's intention for using the speaker 430 or 530. Upon sensing the signal indicating the state where the cable 420 or 520 is extracted, the control circuit may activate an output of audio data.

Figure 8:
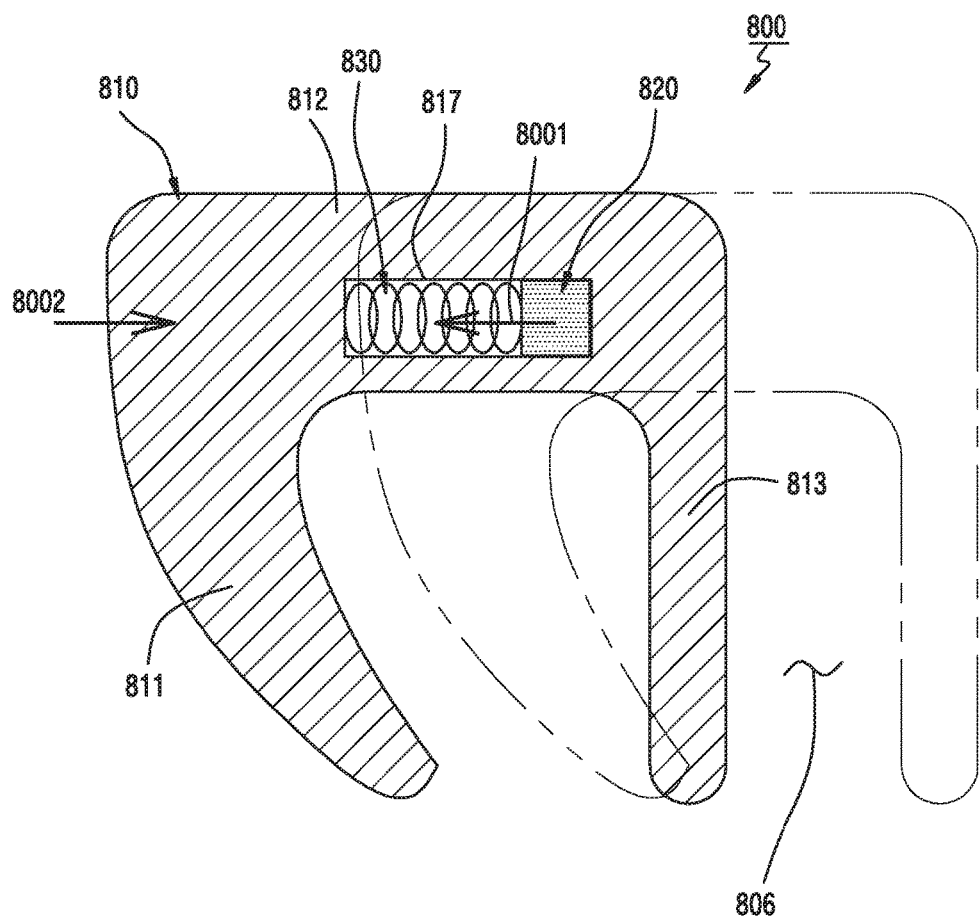
FIGS. 8, 9 and 10 illustrate a structure of a coupling device according to various embodiments of the present disclosure.
Figure 9:
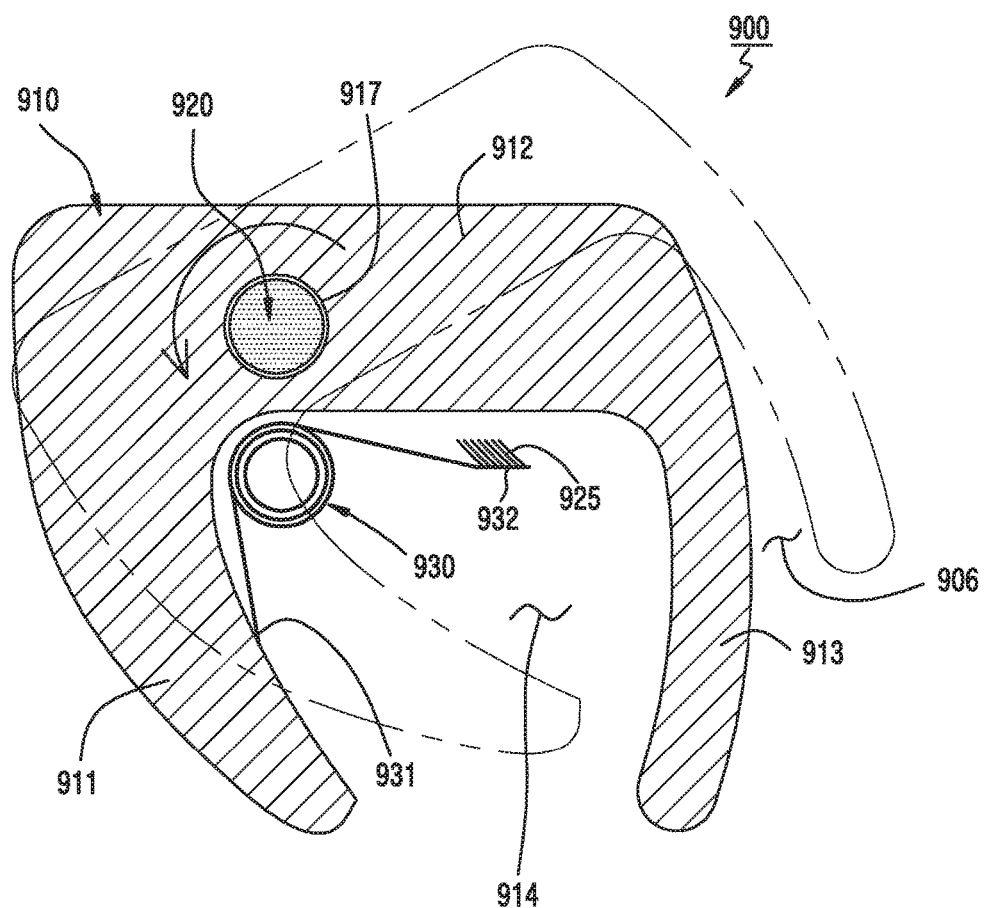
Figure 10:
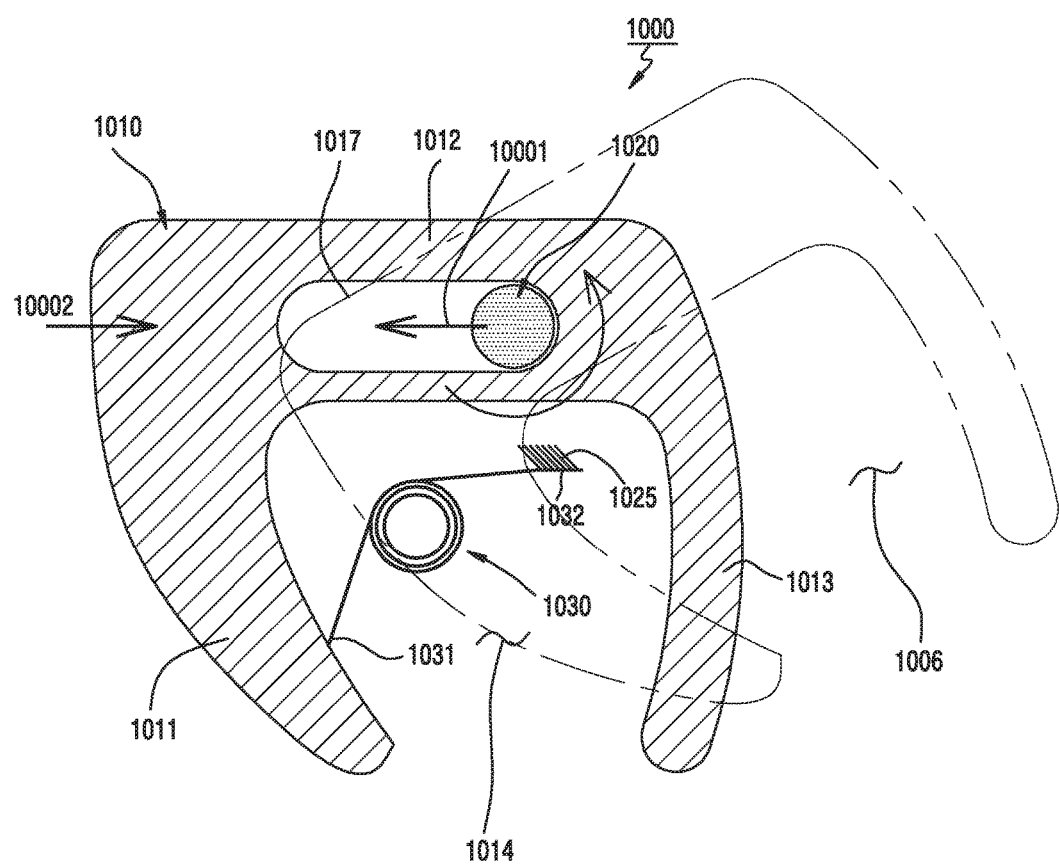

FIGS. 8 to 10 illustrate a structure of a coupling device according to various embodiments of the present disclosure.

Referring to FIGS. 8 to 10, a coupling device 800 may include all or some parts of the coupling device 450 or FIG. 4 or the coupling device 550 of FIG. 5. The coupling device 800 may include a moving member 810, a slider 820, and an elastic member 830. According to an embodiment, the moving member 810 may have a shape substantially similar to FIGS. 7A to 7C. For example, the moving member 810 may have a substantially inverted 'U' shape. When viewed in cross-section, the moving member 810 may include a first extension portion 811, a second extension portion 812, and a third extension portion 813.

According to an embodiment, the second extension portion 812 of the moving member 810 may include a sliding groove 817. For example, the sliding groove 817 may be formed to be long in a second direction 8002 substantially facing an inner portion of a curved housing (e.g., 410 of FIG. 4). The slider 820 may be disposed to the sliding groove 817. The slider 820 may be moved in a first direction 8001 by being guided to the sliding groove 817, and the moving member 810 may be moved in the second direction 8002 opposite to the first direction 8001.

According to an embodiment, the slider 820 may be one part of the housing (e.g., 410 of FIG. 4 or 510 of FIG. 5). For example, when the moving member 810 moves in the second direction 8002 on the housing 410 or 510, the third extension portion 813 of the moving member 810 may relatively protrude with respect to the housing (e.g., 410 of FIG. 4 or 510 of FIG. 5). The external object (e.g., the user's clothing) can be coupled in a space 806 between the housing 410 or 510 and the third extension portion 813 of the moving member 810.

According to an embodiment, the elastic member 830 (e.g., a compressed coil spring) may be disposed to the sliding groove 817. Due to external force, the external member 810 may be elastically supported by the elastic member 830 when moved in the second direction 8002. When the external force is removed, the moving member 810 may be restored in the first direction 8001 due to elasticity of the elastic member 830.

Referring to FIG. 9, a coupling device 900 may include all or some parts of the coupling device 450 of FIG. 4 or the coupling device 550 of FIG. 5. The coupling device 900 may include a moving member 910, a shaft 920, and a torsion coil spring 930. According to various embodiments, the moving member 910 may have a substantially inverted 'U' shape. When viewed in cross-section, the moving member 910 may include a first extension portion 911, a second extension portion 912, and a third extension portion 913.

According to an embodiment, the second extension portion 912 of the moving member 910 may include a shaft hole 917. The shaft 920 may be disposed to the shaft hole 917. The moving member 910 may rotate about the shaft 920. The shaft 920 may be one part of the housing (e.g., 410 of FIG. 4 or 510 of FIG. 5). For example, when rotating on the housing 410 or 510, the third extension portion 913 of the moving member 910 may relatively protrude with respect to the housing (e.g., 410 of FIG. 4 or 510 of FIG. 5). An external object (e.g., a user's clothing) can be coupled to a space 906 between the housing 410 or 510 and the third extension portion 913 of the moving member 910.

According to various embodiments, the third extension portion 913 of the moving member 910 may have a curved shape which is convex in a direction (e.g., 4003 of FIG. 4) substantially facing an inner portion of the curved housing (e.g., 410 of FIG. 4). The curved third extension portion 913 may improve a coupling for holding the external object.

The moving member 910 may rotate in a state of being elastically supported by the torsion coil spring 930. When the external force is removed, the moving member 910 may be restored by elasticity of the torsion coil spring 930. According to an embodiment, the torsion coil spring 930 may include a torsion coil spring. For example, the torsion coil spring 930 may be disposed to a space 914 between the first extension portion 911, second extension portion 912, and third extension portion 913 of the moving member 910. One end portion 931 of the torsion coil spring 930 may be supported by the first extension portion 911 of the moving member 910, and the other end portion 932 of the torsion coil spring 930 may be supported by one part 925 of the housing (e.g., 410 of FIG. 4 or 510 of FIG. 5).

Referring to FIG. 10, a coupling device 1000 may include all or some parts of the coupling device 450 of FIG. 4 or the coupling device 550 of FIG. 5. The coupling device 1000 may include a moving member 1010, a shaft 1020, and a torsion coil spring 1030. According to various embodiments, the moving member 1010 may have a substantially inverted 'U' shape. When viewed in cross-section, the moving member 1010 may include a first extension portion 1011, a second extension portion 1012, and a third extension portion 1013.

According to an embodiment, the second extension portion 1012 of the moving member 1010 may include a shaft hole 1017. The shaft 1020 may be disposed to the shaft hole 1017. The shaft 1020 may be moved in a first direction 10001 by being guided to the shaft hole 1017, and the moving member 1010 may be moved in a second direction 10002 opposite to the first direction 10001. The shaft 1020 may be one part of the housing (e.g., 410 of FIG. 4 or 510 of FIG. 5).

According to an embodiment, the moving member 1010 may rotate about the shaft 1020.

For example, due to external force, the moving member 1010 may move and/or rotate on the housing (e.g., 410 of FIG. 4 or 510 of FIG. 5). Due to the movement and/or rotation of the moving member 1010, the third extension portion 1013 of the moving member 1010 may relatively protrude with respect to the housing (e.g., 410 of FIG. 4 or 510 of FIG. 5). The external object (e.g., the user's clothing) can be coupled in a space 1006 between the housing 410 or 510 and the third extension portion 1013 of the moving member 1010.

According to various embodiments, the third extension portion 1013 of the moving member 1010 may have a curved shape similar to the third extension portion 913 of the moving member 910 of FIG. 9.

The moving member 1010 may move and/or rotate in a state of being elastically supported by the torsion coil spring 1030 when moving and/or rotating. When external force is removed, the moving member 1010 may be restored by elasticity of the torsion coil spring 1030. According to an embodiment, the torsion coil spring 1030 may include a torsion coil spring. The torsion coil spring 1030 may be disposed to a space 1014 between the first extension portion 1011, second extension portion 1012, and third extension portion 1013 of the moving member 1010. For example, one end portion 1031 of the torsion coil spring 1030 may be supported by the first extension portion 1011 of the moving member 1010, and the other end portion 1032 of the torsion coil spring 1030 may be supported by one part 1025 of the housing (e.g., 410 of FIG. 4 or 510 of FIG. 5).

According to various embodiments, the coupling device 1000 may further include a spring disposed to the shaft hole 1017. The moving member 1010 may move in a second direction 10002 in a state of being elastically supported by a spring (e.g., a compressed coil spring).

Figure 11:
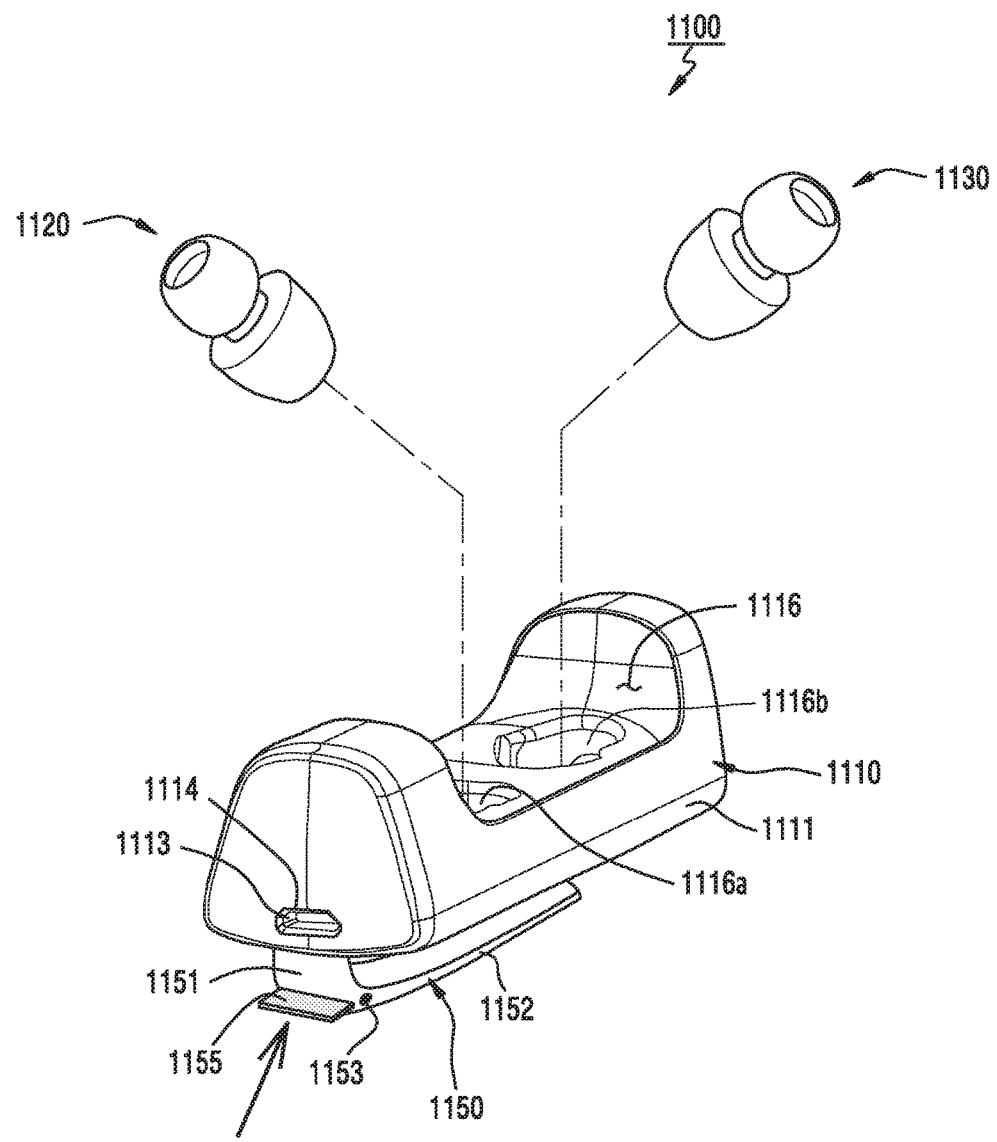
FIG. 11 illustrates an electronic device according to an embodiment of the present disclosure.

FIG. 11 illustrates an electronic device according to an embodiment of the present disclosure.

Figure 12A:
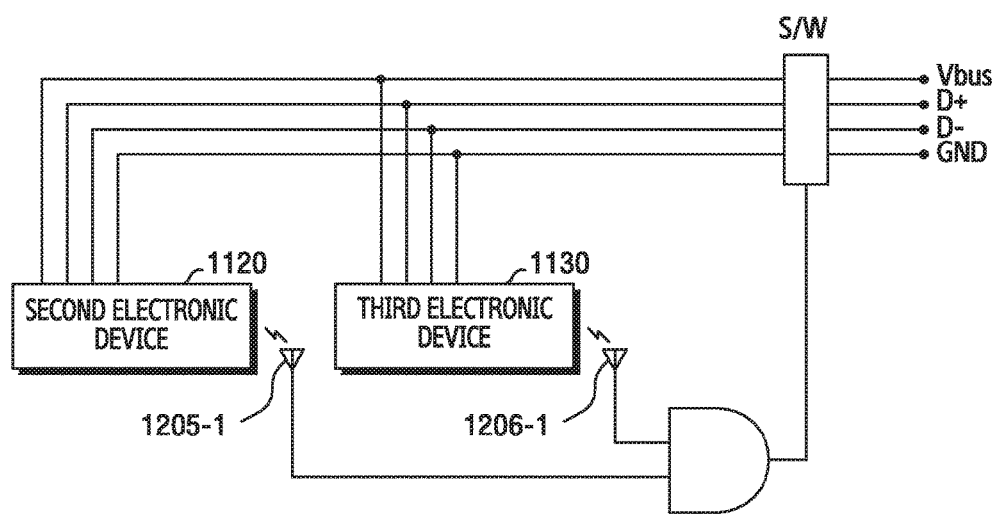
FIGS. 12A, 12B, and 12C illustrate a circuit for sensing a state where a second electronic device and a third electronic device are connected to a first electronic device according to various embodiments of the present disclosure.
Figure 12B:
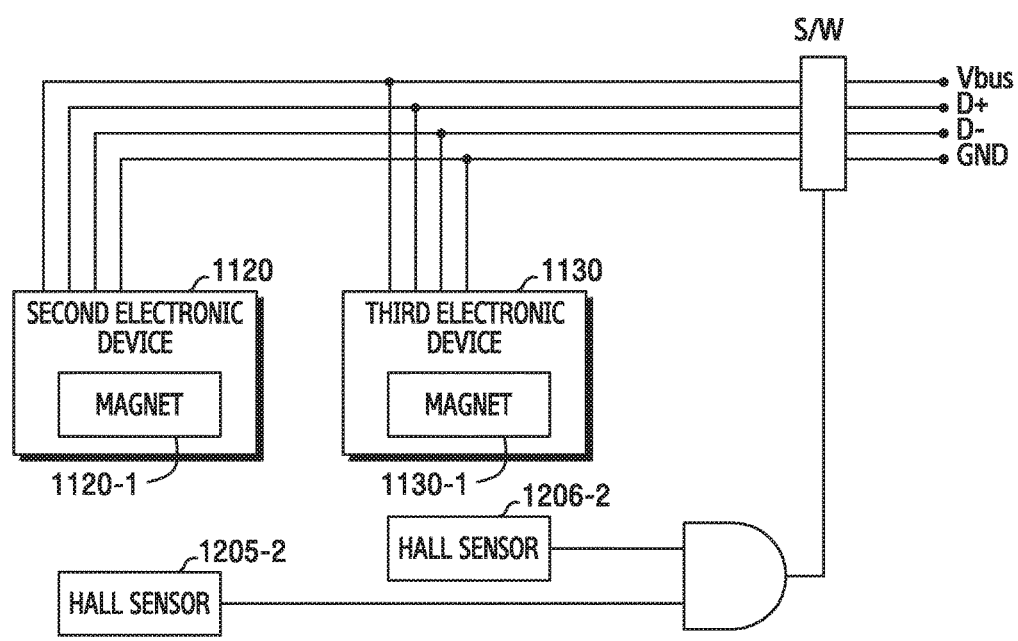
Figure 12C:
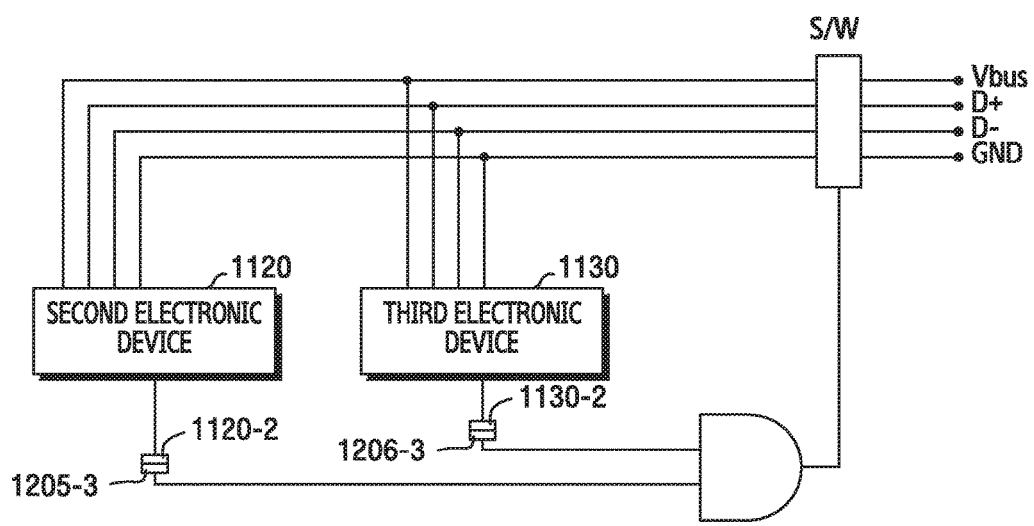

FIGS. 12A to 12C illustrate a circuit for sensing a state where a second electronic device and a third electronic device are connected to a first electronic device according to various embodiments of the present disclosure. According to various embodiments, an electronic device may include all or some parts of the electronic device 101 of FIG. 1 or the electronic device 201 of FIG. 2.

Referring to FIG. 11, an electronic device 1100 may include a first electronic device 1110, a second electronic device 1120, and a third electronic device 1130.

According to an embodiment, the first electronic device 1110 may include a housing 1111 and a coupling device 1150. According to various embodiments, the first electronic device 1110 may include various electronic components (not shown) (e.g., a processor, a memory, a sensor, an input device, a display, an indicator, a battery, a motor, etc.) installed in the housing 1111.

According to an embodiment, the first electronic device 1110 may include a port 1113 used to connect the first electronic device 1110 to an external device in a wired fashion. The housing 1111 includes an opening 1114, and the external device may be electrically connected to the port 1113 through the opening 1114. For example, the first electronic device 1110 may receive video data or audio data from the external device connected to the port 1113, and may store it in a memory. For another example, the first electronic device 1110 may receive power from the external device connected to the port 1113, and may charge a battery of the first electronic device 1110 by using the power.

According to an embodiment, the housing 1111 may include a mounting portion 1116 capable of coupling the second electronic device 1120 and the third electronic device 1130. The mounting portion 1116 may include a first mounting portion 1116a capable of coupling the second electronic device 1120 and a second mounting portion 1116b capable of coupling the third electronic device 1130. The mounting portion 1116 may have a substantially groove shape capable of accommodating at least one part of the second electronic device 1120 and the third electronic device 1130.

According to an embodiment, if the second electronic device 1120 is coupled to the first mounting portion 1116a, the first electronic device 1110 and the second electronic device 1120 may be electrically connected. If the third electronic device 1130 is coupled to the second mounting portion 1116b, the first electronic device 1110 and the third electronic device 1130 may be electrically connected. For example, the mounting portion 1116 may include contacts used to electrically connect the second electronic device 1120 and the third electronic device 1130. The second electronic device 1120 and the third electronic device 1130 may include contacts used to electrically connect the contacts of the mounting portion 1116.

According to an embodiment, the second electronic device 1120 and the third electronic device 1130 may include an earphone. For example, the second electronic device 1120 may be an earphone to be worn on a user's right ear. The third electronic device 1130 may be an earphone to be worn on a user's left ear.

According to an embodiment, the second electronic device 1120 and the third electronic device 1130 may include a battery (not shown). The second electronic device 1120 may be coupled to the first mounting portion 1116*a*, and may be provided with power from the first electronic device 1110 to charge the battery. The third electronic device 1130 may be coupled to the second mounting portion 1116*b*, and may be provided with power from the first electronic device 1110 to charge the battery.

According to an embodiment, the second electronic device 1120 and the third electronic device 1130 may include a memory (not shown). The second electronic device 1120 may be coupled to the first mounting portion 1116*a*, and may be provided with audio data from the first electronic device 1110 to store it in the memory. The third electronic device 1130 may be coupled to the second mounting portion 1116*b*, and may be provided with audio data from the first electronic device 1110 to store it in the memory.

According to various embodiments, the second electronic device 1120 and the third electronic device 1130 may perform near-distance wireless communication with respect to the first electronic device 1110. For example, the first electronic device 1110 may wirelessly transmit audio data to the second electronic device 1120 and the third electronic device 1130, and the second electronic device 1120 and the third electronic device 1130 may store the received audio data in the memory.

According to an embodiment, the second electronic device 1120 and the third electronic device 1130 may include a processor (not shown) capable of reproducing the audio data stored in the memory. For example, the second electronic device 1120 and the third electronic device 1130 may reproduce the audio data stored in the memory, generate an audio signal, and output the generated audio signal through a speaker.

According to another embodiment, the first electronic device 1110 may reproduce the audio data stored in the memory, generate an audio signal, and wirelessly transmit the generated audio signal to the second electronic device 1120 and the third electronic device 1130. The second electronic device 1120 and the third electronic device 1130 may output the received audio signal to the speaker.

FIG. 12A to FIG. 12C illustrate a circuit for sensing a state where a second electronic device and a third electronic device are connected to a first electronic device according to various embodiments.

Referring to FIG. 12A according to various embodiments, the first electronic device 1110 may include a first proximity sensor 1205-1 installed in the first mounting portion 1116*a* and a second proximity sensor 1206-1 installed in the second mounting portion 1116*b*. If the second electronic device 1120 is coupled to the first mounting portion 1116*a* of the first electronic device 1110, the first proximity sensor 1205-1 of the first electronic device 1110 may output a corresponding signal regarding that the second electronic device 1120 is electrically connected to the first electronic device 1110. If the third electronic device 1130 is coupled to the second mounting portion 1116*b* of the first electronic device 1110, the second proximity sensor 1206-1 of the first electronic device 1110 may output a corresponding signal regarding that the third electronic device 1130 is electrically connected to the first electronic device 1110.

Referring to FIG. 12B according to various embodiments, the first electronic device 1110 may include a first hall sensor 1205-2 installed in the first mounting portion 1116*a* and a second hall sensor 1206-2 installed in the second mounting portion 1116*b*. The second electronic device 1120 may include a first magnet 1120-1. The third electronic device 1130 may include a second magnet 1130-1. If the second electronic device 1120 is coupled to the first mounting portion 1116*a* of the first electronic device 1110, the first hall sensor 1205-2 of the first electronic device 1110 may recognize the first magnet 1120-1 of the second electronic device 1120. If the third electronic device 1130 is coupled to the second mounting portion 1116*b* of the first electronic device 1110, the second hall sensor 1206-2 of the first electronic device 1110 may recognize the second magnet 1130-1 of the third electronic device 1130.

Referring to FIG. 12C according to various embodiments, the first electronic device 1110 may include a first contact 1205-3 installed in the first mounting portion 1116*a* and a second contact 1206-3 installed in the second mounting portion 1116*b*. The second electronic device 1120 may include a first contact 1120-2. The third electronic device 1130 may include a second contact 1130-2. If the second electronic device 1120 is coupled to the first mounting portion 1116*a* of the first electronic device 1110, a first contact 1205-3 of the first electronic device 1110 may be electrically connected to the first contact 1205-3 of the first electronic device 1110. If the third electronic device 1130 is coupled to the second mounting portion 1116*b* of the first electronic device 1110, a second contact 1206-3 of the first electronic device 1110 may be electrically connected to the second contact 1130-2 of the third electronic device 1130.

The coupling device 1150 may be coupled to the housing 1111, and may be used to mechanically couple the first electronic device 1110 to an external object. According to an embodiment, the coupling device 1150 may include a first extension portion 1151, a second extension portion 1152, a connection portion 1153, and a manipulation portion 1155.

One end portion of the first extension portion 1151 may be coupled to the housing 1111, and the other end portion of the first extension portion 1151 may be included in the connection portion 1153. One end portion of the second extension portion 1152 may be included in the connection portion 1153, and the other end portion of the second extension portion 1152 may be a free end. According to an embodiment, when external force is applied to the manipulation portion 1155, the second extension portion 1152 may rotate about the connection portion 1153, a space may be extended between the second extension portion 1152 and the housing 1111, and an external object (e.g., a user's clothing) may be coupled in this space.

According to various embodiments, the coupling device 1150 may further include an elastic member (e.g., a torsion coil spring) (not shown). If the external force is removed, the second extension portion 1152 may be restored by the elastic member.

According to an embodiment, the first electronic device 1110 may include an input device (not shown) which generates a signal in a state where the coupling device 1150 is mechanically coupled to an external object (e.g., a user's clothing). For example, the input device may include a first contact and second contact coupled to the coupling device 1150. When the coupling device 1150 is changed from a first state of being difficult to be coupled to the external object to a second state of being mechanically coupled to the external object, the first contact and second contact of the input device may be electrically connected to each other. An input signal may be generated through the electrical connection between the first contact and second contact of the input device.

According to various embodiments, the input device using the coupling device 1150 may generate various types of a user input signal for understanding various types of an operation of the first electronic device 1100 together with a button, a touch pad, or the like. For example, in a state where the first electronic device 1100 is not worn on the user's body, the coupling device 1150 may be changed two times from the first state to the second state within a time which is pre-set by the user. In this case, the user may indicate a user's intention for using the electronic device 1100 in a state where the electronic device 1100 is not worn.

According to various embodiments, the first electronic device 1100 may include a control circuit (not shown) (e.g., 210 of FIG. 2) included in the housing 1111 and electrically connected to the input device which uses the coupling device 1150. The control circuit may execute various instructions on the basis of at least one part of various input signals generated from the input device which uses the coupling device 1150.

According to various embodiments, the control circuit may execute various instructions on the basis of not only at least one input signal generated from the input device which uses the coupling device 1150 but also sensor data from at least one sensor installed in the first electronic device 1110, the second electronic device 1120, or the third electronic device 1130. For example, the control circuit may execute various instructions on the basis of sensor data including information regarding whether the second electronic device 1120 or the third electronic device 1130 is separated from the first electronic device 1110. For another example, the control circuit may execute various instructions on the basis of sensor data including information regarding whether the second electronic device 1120 or the third electronic device 1130 is worn on a user's ear.

Figure 13:
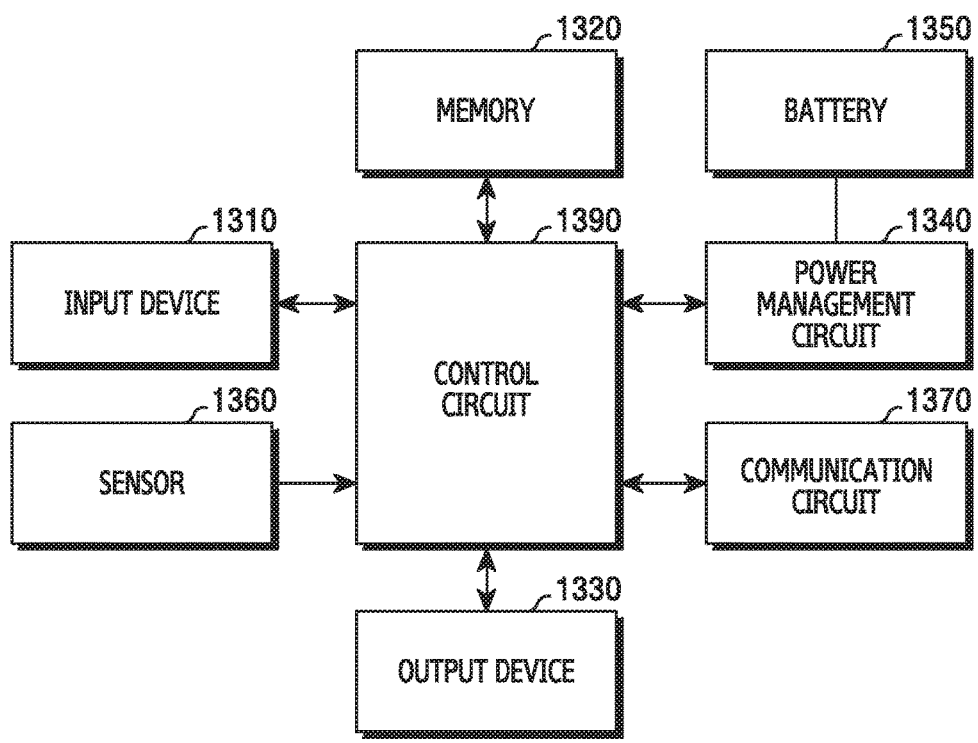
FIG. 13 is a block diagram of an electronic device according to an embodiment of the present disclosure.

FIG. 13 is a block diagram of an electronic device according to an embodiment of the present disclosure.

Figure 14A:
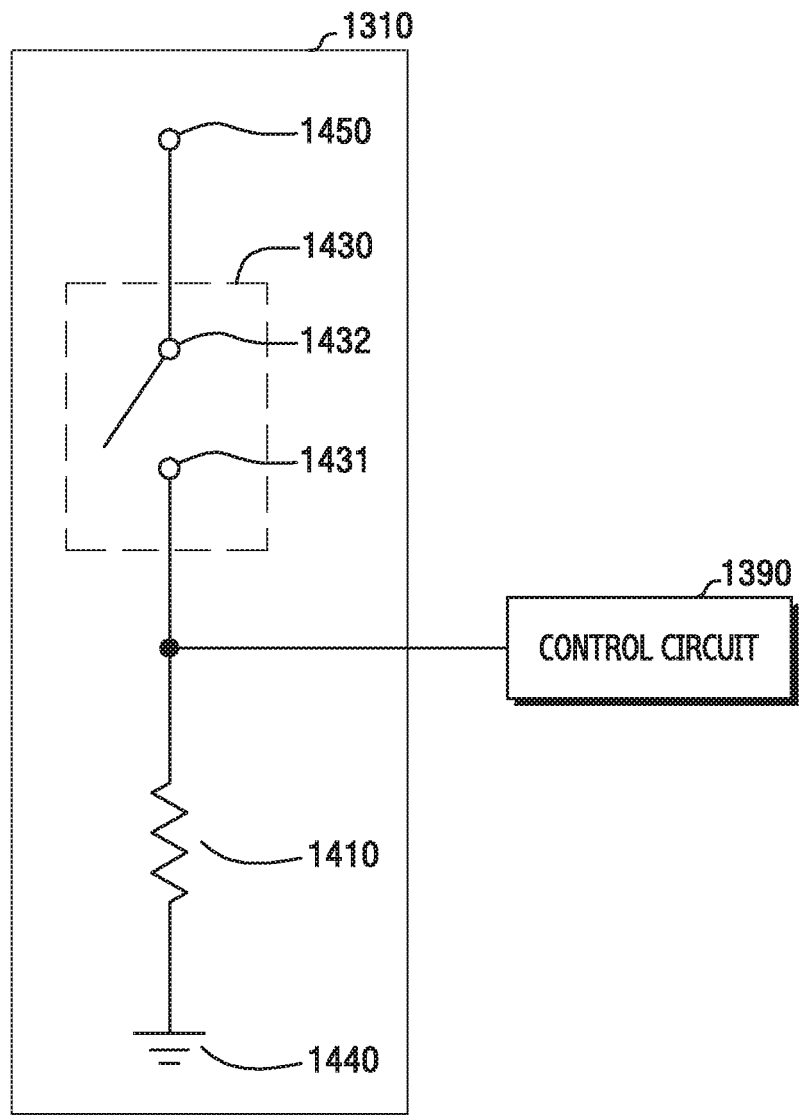
FIGS. 14A and 14B illustrate a circuit diagram of an input device according to various embodiments of the present disclosure.
Figure 14B:
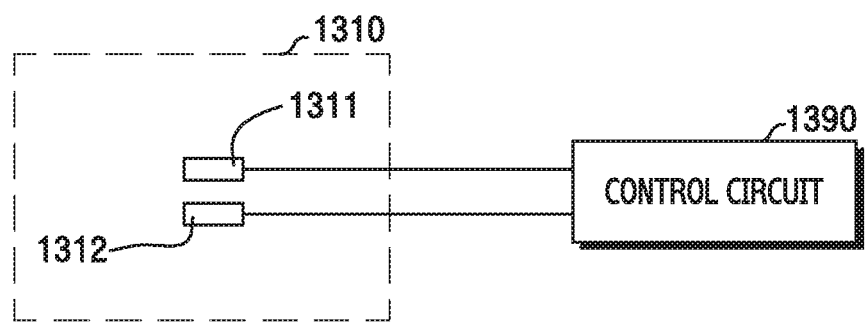

FIGS. 14A and 14B illustrate a circuit diagram of an input device according to various embodiments of the present disclosure. According to various embodiments, an electronic device may include all or some parts of the electronic device 101 of FIG. 1, the electronic device 201 of FIG. 2, the electronic device 400 of FIG. 4, the electronic device 500 of FIG. 5, or the electronic device 1100 of FIG. 11.

Referring to FIG. 13, an electronic device 1300 according to an embodiment may include an input device 1310, a memory 1320, an output device 1330, a power management circuit 1340, a battery 1350, at least one sensor 1360, a communication circuit 1370 and a control circuit 1390.

According to an embodiment, the input device 1310 (or an input signal generating device) may generate an input signal when a coupling device (e.g., 450 of FIG. 4 or 550 of FIG. 5 or 1150 of FIG. 11) of the electronic device 1300 is in a second state. The second state may be a state where the coupling device is changed so as to be mechanically coupled to an external object. For example, the input device 1310 may include a first contact and second contact coupled to the coupling device. When the coupling device is in the second state, the first contact and second contact of the input device 1310 may be electrically connected to each other. An input signal may be generated through the electrical connection between the first contact and second contact of the input device 1310.

According to an embodiment, the input device 1310 may not generate the input signal when the coupling device (e.g., 450 of FIG. 1, 550 of FIG. 5 or 1150 of FIG. 11) of the electronic device 1300 is in a first state. The first state may be a state where the coupling device is difficult to be mechanically coupled to the external object, for example, a state where the coupling device is restored by an elastic member. When the coupling device is in the first state, the first contact and second contact of the input device 1310 may not be electrically connected to each other.

According to various embodiments, various input signals may be generated from the input device 1310 depending on the first state or second state of the coupling device (e.g., 450 of FIG. 4 or 550 of FIG. 5 or 1150 of FIG. 11). For example, a duration in which the input signal generated from the input device 1310 is continued may be various depending on a duration in which the second state is continued. For another example, the number of times of generating the input signal from the input device 1310 may be various depending on the number of times by which the coupling device transitions from the first state to the second state.

Referring to FIG. 14A, the input device 1310 may include a circuit for a pull-down resistor. For example, the input device 1310 may include a pull-down resistor 1410 and a switch 1430.

One end portion of the pull-down resistor 1410 may be electrically connected to a ground member 1440, and the other end portion of the pull-down resistor 1410 may be electrically connected to the switch 1430. The ground member 1440 may include a ground of a printed circuit board (PCB) mounted on the electronic device 1300.

One end portion of the switch 1430 may be electrically connected to a battery power 1450, and the other end portion of the switch 1430 may be electrically connected to the pull-down resistor 1410. Alternatively, although not shown, the switch 1430 may be connected to a power source designed in various types in place of the battery power 1450.

The control circuit 1390 (e.g., the processor 120 of FIG. 1 or the processor 210 of FIG. 2) may be electrically connected to an electrical path between the pull-down resistor 1410 and the switch 1430.

According to an embodiment, the switch 1430 may include a first contact 1431 and second contact 1432 connected to the coupling device (e.g., 450 of FIG. 4, 550 of FIG. 5 or 1150 of FIG. 11). When the coupling device is in the first state, the first contact 1431 and second contact 1432 of the switch 1430 may not be electrically connected to each other, and the switch 1430 may be in an open state. Alternatively, when the coupling device is in the second state, the first contact 1431 and second contact 1432 of the switch 1430 may be electrically connected to each other, and the switch 1430 may be in a closed state.

When the switch 1430 is in the open state, a low signal may be provided to the control circuit 1390. Alternatively, when the switch 1430 is in the closed state, a high signal may be provided to the control circuit 1390.

Referring to FIG. 14B, the input device 1310 may include a hall sensor 1311 disposed to a first portion of the coupling device (e.g., 450 of FIG. 4, 550 of FIG. 5 or 1150 of FIG. 11) and a magnet 1412 disposed a second portion of the coupling device. For example, when the coupling device is in the second state, the magnet may be adjacent to the hall sensor, and the hall sensor may provide an input signal for the second state to the control circuit 1390.

According to various embodiments, the electronic device 1300 (e.g., 400 of FIG. 4 or 500 of FIG. 5) may further include a sensor for outputting a signal indicating that a cable (e.g., 420 of FIG. 4 or 520 of FIG. 5) is extracted.

According to various embodiments, the input device 1310 may include at least one part of the input device 250 of FIG. 2, and a detailed description thereof will be omitted.

The memory 1320 may store various basic operating systems required for operations and may also store data, application programs, algorithms, or the like corresponding to various user functions. The memory 1320 may include, for example, a fast random access memory such as one or more magnetic disc storage devices and/or a non-volatile memory, one or more optical storage devices, and/or a flash memory (e.g., NAND, NOR).

According to an embodiment, the memory 1320 may include a non-volatile memory for storing first audio data (e.g., 'non-volatile audio data') received from an external device (e.g., a server, a smart phone, a PC, a PDA, an access point, etc.). Alternatively, the memory 1320 may include a volatile memory for storing second audio data (e.g., 'volatile audio data') received from the external device.

According to an embodiment, the output device 1330 may include various types of a speaker designed to output audio data. According to various embodiments, the output device 1330 may include the earphone 430 of FIG. 4, the earphone 530 of FIG. 5, or the earphones 1120 and 1130 of FIG. 11.

According to various embodiments, the output device 1330 may include various types of a display designed to output video data. For example, the display may be designed to provide various screen interfaces required for an operation of the electronic device 1300. The display may provide a user interface regarding reproduction of audio data. Alternatively, the display may provide a user interface regarding a function of receiving the audio data from the external device. Alternatively, the display may provide a user interface for a function of receiving the audio data from the external device and transmitting the received audio data to another external electronic device.

According to various embodiments, the output device 1330 may include various indicators indicating a state of the electronic device 1300. For example, the electronic device 1300 may include an LED designed to display color differently according to a battery remaining amount.

According to various embodiments, the output device 1330 may have various shapes that can be physically separated from the electronic device 1300. For example, the second electronic device 1120 and third electronic device 1130 of FIG. 11 may be physically separated from the electronic device 1100. The second electronic device 1120 and the third electronic device 1130 may perform various types of communication (e.g., near-distance wireless communication) with respect to a communication circuit (e.g., 1370 of FIG. 13).

The power management circuit 1340 (e.g., a PMIC) may effectively manage and optimize a power usage of the battery 1350 in the electronic device 1300. For example, the control circuit 1390 (e.g., the processor 120 of FIG. 1 or the processor 210 of FIG. 2) may transmit to the power management circuit 1340 a corresponding signal according to a load to be processed. The power management circuit 1340 may regulate power to be supplied to the control circuit 1390.

According to an embodiment, the power management circuit 1340 may include a battery charging circuit. For example, when the electronic device 1300 is connected to the external device, the power management circuit 1340 may be provided with power from the external device to charge the battery 1350.

According to various embodiments, the power management circuit 1340 may further include a wireless power transceiver circuit. For example, the power management circuit 1340 may wirelessly receive power from the external device through at least one antenna (not shown) (e.g., a coil or a coil-shaped pattern) or wirelessly transmit the power from the external device.

According to an embodiment, the power management circuit 1340 may include a wireless power transceiver circuit of an electromagnetic induction type. For example, if a magnetic field which flows through an antenna (e.g., a coil) of the external device is applied to at least one antenna of the electronic device 1300, induced current may flow through at least one part of the at least one antenna, and the power management circuit 1340 may provide power to a load of the electronic device 1300 by using the induced current (e.g., battery charging). Alternatively, the power management circuit 1340 may wirelessly transmit power to the external device by using electromagnetic induction between the antenna of the external device and at least one part of the at least one antenna of the electronic device 1100. According to various embodiments, a wireless power transceiver circuit of an electromagnetic induction type may conform to a Wireless Power Consortium (WPC) standard. A power transceiver circuit 621 of an electromagnetic induction type according to the WPC standard may use a frequency of 110 to 205 kHz to wirelessly receive power from the external device or wireless transmit power to the external device. Alternatively, the wireless power transceiver circuit of the electromagnetic induction type may conform to a Power Matter Alliance (PMA) standard. A wireless power transceiver circuit of an electromagnetic induction type according to the PMA standard may use a frequency of 227 to 257 kHz or a frequency of 118 to 153 kHz to wirelessly receive power from the external device or wirelessly transmit power to the external device.

According to another embodiment, the power management circuit 1340 may include a wireless power transceiver circuit of an electromagnetic resonance type. For example, at least one part of at least one antenna of the electronic device 1300 and an antenna (e.g., a coil) for power transmission of the external device may have the same resonance frequency, and the power management circuit 1140 may use a resonance phenomenon between them to receive power from the external device or transmit power to the external device. According to various embodiments, the wireless power transceiver circuit of the electromagnetic resonance type may conform to an Alliance for Wireless Power (A4WP) standard. A wireless power transceiver circuit of an electromagnetic resonance type according to the A4WP standard may use a resonance frequency of 6.78 MHz to wirelessly receive power from the external device or wirelessly transmit power to the external device.

According to various embodiments, the electronic device 1300 may include at least one sensor 1360. At least one sensor 1360 may measure physical quantity or sense an operating state of the electronic device 1300. The sensor 1360 may convert measured or sensed information into an electrical signal.

According to various embodiments, at least one sensor 1360 may include all or some parts of the sensor module 240 of FIG. 2.

According to an embodiment, at least one sensor 1360 may acquire sensor data used to identify whether a user is in proximity to the electronic device 1300. For example, at least one sensor 1360 may acquire sensor data indicating a state where an earphone (e.g., 430 of FIG. 4, 530 of FIG. 5, or 1120 or 1130 of FIG. 11) is worn on a user's ear.

According to another embodiment, at least one sensor 1360 may acquire sensor data indicating a movement state of the electronic device 1300.

According to another embodiment, at least one sensor 1360 may acquire sensor data regarding a user's biometric state.

According to various embodiments, at least one sensor 1360 may sense a first state or second state of a coupling device (e.g., 450 of FIG. 4, 550 of FIG. 5 or 1150 of FIG. 11). For example, at least one sensor 1360 may include a hall sensor disposed to a first portion of the coupling device 450, 550, or 1150 or a magnetic disposed to a second portion of the coupling device. For example, if the coupling device is in the second state, the magnet may be adjacent to the hall sensor, and the hall sensor may provide sensor data regarding the second state of the coupling device to the control circuit 1390.

According to an embodiment, the control circuitry 1390 (e.g., the processor 120 of FIG. 1 or the processor 210 of FIG. 2) may execute various instructions of the electronic device 1300 on the basis of at least one part of an input signal of the input device 1310 or sensor data from at least one sensor 1360. For example, the control circuit 1390 may activate or deactivate (e.g., power-on or off) the electronic device 1300 on the basis of at least one part of the input signal or sensor data. For another example, the control circuit 1390 may activate various types of a mode, program, or application of the electronic device 1300 on the basis of the at least one part of the input signal or sensor data.

According to an embodiment, the control circuit 1390 may activate or deactivate an audio output on the basis of the at least one part of the input signal or sensor data. Alternatively, the control circuit 1390 may perform various functions (e.g., a playback start, a playback pause, a playback stop, a playback speed control, a volume control, another audio data playback, etc.) on the basis of the at least one part of the input signal or sensor data.

For example, the control circuit 1390 may automatically activate the audio output on the basis of sensor data indicating a state where the earphone (e.g., 430 of FIG. 4, 530 of FIG. 5, or 1120 or 1130 of FIG. 11) is worn on a user's ear.

For another example, the control circuit 1390 may automatically activate the audio output on the basis of sensor data indicating a state where the electronic device (e.g., 1300 of FIG. 13) moves in a pre-defined manner.

For another example, the control circuit 1390 may automatically activate the audio output on the basis of sensor data indicating a state where user's biometric information is pre-defined.

For another example, the control circuit 1390 may automatically activate the audio output on the basis of a signal indicating a state where a cable (e.g., 420 of FIG. 4 or 520 of FIG. 5) is extracted.

According to various embodiments, the audio output may include an operation in which the electronic device 1300 outputs audio data or an audio signal through a speaker. Alternatively, the audio output may include an operation in which the electronic device 1300 transmits the audio data or the audio signal to the external device.

According to various embodiments, the control circuit 1390 may communicate with the external device (e.g., the electronic device 102 or 104 of FIG. 1) or the server (e.g., the server 106 of FIG. 1) through the communication circuit 1370 on the basis of at least one part of the input signal from the input device 1310 or sensor data from at least one sensor 1360. For example, the control circuit 1390 may receive video data or audio data from the external device or the server, or may transmit the video data or the audio data to the external device or the server.

According to various embodiments, the control circuit 1390 (e.g., an audio processing circuit) may support a function of collecting audio data. The control circuit 1390 may reproduce the collected audio data. For example, the control circuit 1390 may include an audio decoder (not shown) and a D/A converter (not shown). The audio decoder may convert the audio data stored in the memory 1320 into a digital audio signal. The D/A converter may convert a digital audio signal converted by the audio decoder into an analog audio signal. Alternatively, the audio decoder may convert the audio data, which is stored in the memory 1320 by being received from the external device (e.g., a server, a smart phone, a PC, a PDA, an access point, etc.) via the communication circuit 1370, into a digital audio signal. A speaker of the output device 1330 may output the analog audio signal converted by the D/A converter.

According to an embodiment, the control circuit 1390 may include an A/D converter (not shown). The A/D converter may convert an analog voice signal, which is delivered via a microphone of the input device 1310, into a digital audio signal.

According to various embodiments, the control circuit 1390 may reproduce various audio data which is set in an operation of the electronic device 1300. For example, when the input device 1310 or at least one sensor 1360 generates a signal regarding the second state of the coupling device (e.g., 450 of FIG. 4, 550 of FIG. 5, or 1150 of FIG. 11), the control circuit 1390 may be designed to reproduce audio data regarding a corresponding effect or guidance sound. Alternatively, when it is sensed that the electronic device 1300 is coupled to the external device (e.g., a charging device) or is detached from the external device, the control circuit 1390 may be configured to reproduce audio data regarding a corresponding effect or guidance sound. An output of the effect or guidance sound may be omitted according to a user's configuration or a designer's intention.

According to various embodiments, the control circuit 1390 may receive state information of the external device (e.g., the electronic device 102 or 104 of FIG. 1) from the communication circuit 1370, and may execute various instructions on the basis of at least one part of the state information of the external device.

According to various embodiments, the control circuit 1390 may provide a voice recognition function for generating a voice command from an analog voice signal received by using a microphone of the input device 1310. The voice command may be related to an input for supporting reception, transmission, reproduction, or the like of audio data.

According to an embodiment, the control circuit 1390 may be configured to control various signal flow controls and information collection, output, or the like for supporting various modes of the electronic device 1390. The control circuit 1390 may include constitutional elements of FIG. 15 (e.g., input signal collecting unit 1501, a usage mode determining unit, an audio output mode setting unit, an audio output activating unit, and a sensor data collecting unit).

According to various embodiments, the electronic device 1300 may further include the communication circuit 1370 supporting various types of communication by using at least one antenna. For example, the communication circuit 1370 may include all RF components between the antenna and the control circuit 1390. For example, when receiving a radio signal, the communication circuit 1370 may receive the radio signal from the antenna, may convert the received radio signal into a baseband signal, and may transmit the converted baseband signal to the control circuit 1390. The control circuit 1390 may process the received baseband signal, and may control a human/machine interface of the electronic device 1300 corresponding to the received baseband signal. Alternatively, when transmitting the radio signal, the control circuit 1390 may generate a baseband signal and output the signal to the communication circuit 1370. The communication circuit 1370 may receive the baseband signal from the control circuit 1390, may convert the received baseband signal into a radio signal, and may transmit the signal to the air through the antenna.

According to various embodiments, the communication circuit 1370 may use at least one antenna to support at least one communication type among single input multiple output (SIMO), multiple input single output (MISO), diversity, and multiple input multiple output (MIMO).

According to various embodiments, the communication circuit 1370 may support various types of wired communication with respect to the external device. For example, the communication circuit 1370 may include at least one contact. The electronic device 1300 may be mounted on a mounting unit of the external device, and at least one contact of the electronic device 1300 may be electrically connected to at least one contact installed in the mounting unit of the external device.

According to an embodiment, the communication circuit 1370 may support audio data reception from the external device (e.g., a server, a smart phone, a PC, a PDA, an access point, etc.). Alternatively, the communication circuit 1370 may support audio data transmission to the external device.

According to various embodiments, the electronic device 1300 may include at least one antenna (not shown). The at least one antenna may support various types of communication. According to an embodiment, the at least one antenna may support near-distance communication.

According to various embodiments, at least one antenna may include a radiator (e.g., a coil) for supporting wireless charging. For example, the at least one antenna may be used to transmit power wirelessly to the external device or to receive power wirelessly from the external device.

According to various embodiments, the at least one antenna may be various types of a metal member installed in the electronic device 1300. For example, the at least one antenna may be disposed to an inner portion of the housing for forming the exterior of the electronic device 1300 or may form one part of one surface of the housing.

According to various embodiments, the housing may include at least one antenna while forming the exterior of the electronic device 1300. When the housing is formed of metal, the housing may include some or all metal areas of at least one antenna housing. Alternatively, the at least one antenna including at least one part of the housing may be exposed.

According to various embodiments, the at least one antenna may be mounted on a PCB on which the communication circuit 1370 is mounted.

According to various embodiments, at least one antenna may be configured of at least one type of a monopole antenna, a dipole antenna, an inverted-F antenna (IFA), a planer inverted-F antenna (PIFA), a loop antenna, or a slot antenna.

According to various embodiments, the electronic device 1300 may further include various modules depending on the provided type. For example, the electronic device 1300 may further include constitutional elements, which have not been mentioned above, such as an Internet communication module for performing an Internet function by communicating with an Internet network and a digital broadcast module for receiving and reproducing a digital broadcast. The constitutional elements may be modified in various manners along with the convergence trend of digital devices, and thus not all such components may be listed here, but the presently claimed disclosure may include one or a plurality of components of the same level as that of the above mentioned components in the device. Further, specific constitutional elements of the electronic device 1300 according to an embodiment may not be included in the above configuration, or there can be substitution of other constitutional elements. This should be easily understood by those ordinarily skilled in the art.

Figure 15:
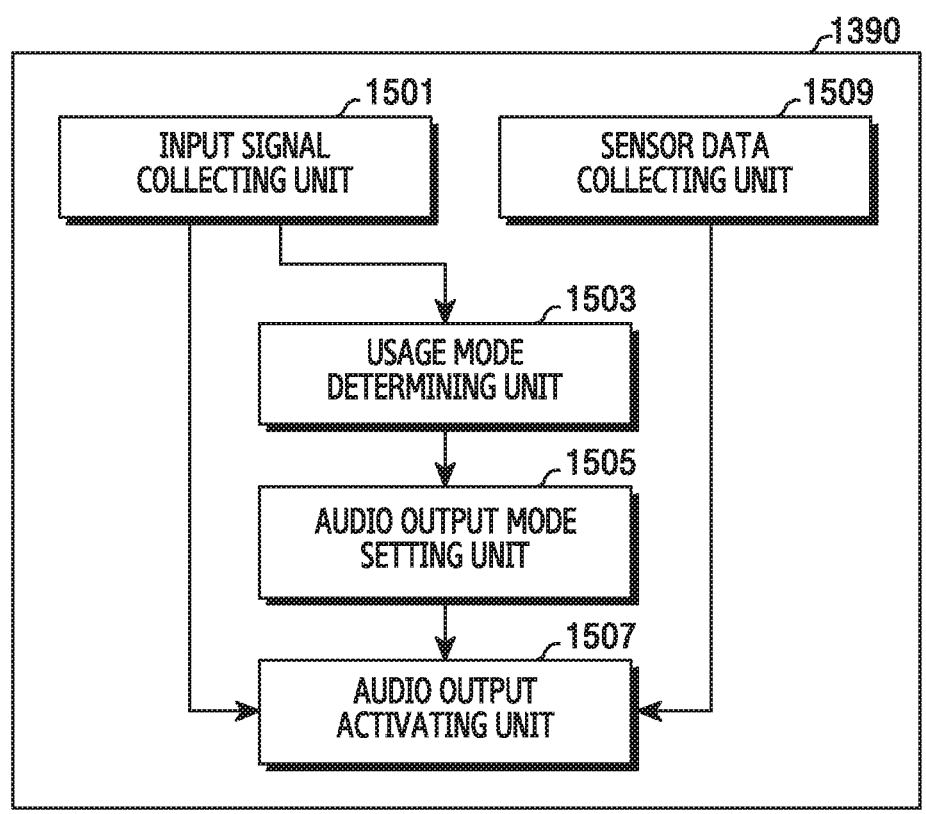
FIG. 15 is a block diagram of a control circuit of FIG. 13 according to an embodiment of the present disclosure.

FIG. 15 is a block diagram of the control circuit according to an embodiment of the present disclosure.

Referring to FIG. 15, the control circuit 1390 may include an input signal collecting unit 1501, a usage mode determining unit 1503, an audio output mode setting unit 1505, an audio output activating unit 1507, and a sensor data collecting unit 1509.

The input signal collecting unit 1501 may acquire various types of an input signal from the input device 1310 of FIG. 13, and may deliver the acquired input signal to the usage mode determining unit 1503. According to an embodiment, the input signal collecting unit 1501 may acquire the various types of the input signal from the input device 1310 which uses a coupling device (e.g., 450 of FIG. 4, 550 of FIG. 5, or 1150 of FIG. 11).

According to another embodiment, the input signal collecting unit 1501 may acquire the input signal through the input device 250 of FIG. 2. Alternatively, the input signal collecting unit 1501 may acquire the input signal through the microphone of the input device 1310.

According to various embodiments, the input signal collecting unit 1501 may acquire the various types of the input signal from the external device through the communication circuit 1370 of FIG. 13.

According to various embodiments, the input signal collecting unit 1501 may receive the various types of the input signal from a portion (e.g., the second electronic device 1120 of third electronic device 1130 of FIG. 11) physically separated from the electronic device 1300. For example, the input signal may be generated by manipulating an input device (e.g., a button, etc.) prepared in the second electronic device 1120 or the third electronic device 1130, and the electronic device 1300 may receive the input signal from the second electronic device 1120 or the third electronic device 1130 through the communication circuit 1370.

The usage mode determining unit 1503 may determine a usage mode of the electronic device (e.g., 400 of FIG. 4, 500 of FIG. 5, or 1100 of FIG. 11) on the basis of at least one part of the input signal from the input signal collecting unit 1501, and may inform this to the audio output mode setting unit 1505.

According to an embodiment, the usage mode may include a wearing mode or a not-wearing mode. Taking FIG. 4 for example, the wearing mode may imply a program or application used in a state where the electronic device 400 is worn on a user's neck. The not-wearing mode may imply a program or application used in a state where the electronic device 400 is not worn on the user's neck.

According to an embodiment, when the coupling device (e.g., 450 of FIG. 4, 550 of FIG. 5, or 1150 of FIG. 11) remains in a second state for more than a threshold time, a first input signal corresponding thereto may be generated from the input device (e.g., 1310 of FIG. 13). The control circuit 1390 may determine the wearing mode on the basis of the first input signal. For example, when the coupling device 450, 505, or 1150 remains in a state of being coupled to an external object (e.g., a user's clothing), the wearing mode may be performed.

According to another embodiment, when the coupling device (e.g., 450 of FIG. 4, 550 of FIG. 5, or 1150 of FIG. 11) is changed from the first state to the second state by a pre-set number of times within a pre-set time, a second input signal corresponding thereto may be generated from the input device 1310 of FIG. 13. The control circuit 1390 may determine the not-wearing mode on the basis of the second input signal. For example, when the coupling device 450, 550, or 1150 is manipulated in a state where the coupling device 450, 550, or 1150 is not coupled to the external object (e.g., the user's clothing), the not-wearing mode may be performed.

The audio output mode setting unit 1505 may set an audio output mode according to the usage mode determined by the usage mode determining unit 1503. According to an embodiment, when the wearing mode is determined, the audio output mode setting unit 1505 may set an automatic audio output mode. Alternatively, when the not-wearing mode is determined, the audio output mode setting unit 1505 may set a manual audio output mode.

The audio output activating unit 1507 may activate or deactivate an audio output according to an audio output mode set by the audio output mode setting unit 1505. According to an embodiment, in the automatic audio output mode, the audio output activating unit 1507 may automatically activate or deactivate the audio output on the basis of at least one part of sensor data acquired through the sensor data collecting unit 1509. Alternatively, in the manual audio output mode, the audio output activating unit 1507 may activate or deactivate the audio output on the basis of at least one part of an input signal acquired through the input signal collecting unit 1501.

The sensor data collecting unit 1509 may acquire various types of sensor data from at least one sensor 1360 of FIG. 13, and may deliver this to the audio output activating unit 1507.

According to an embodiment, the sensor data collecting unit 1509 may acquire sensor data regarding whether the electronic device 1300 is in proximity to the user or is worn on the user from at least one sensor 1360.

For example, referring to FIG. 4, the sensor data collecting unit 1509 may acquire sensor data regarding whether the earphone 430 of the electronic device 400 is worn on a user's ear from the at least one sensor 1360. According to an embodiment, the at least one sensor 1360 (e.g., an illumination sensor, a proximity sensor, etc.) may be installed in the earphone 430, and may detect sensor data regarding whether the earphone 430 is worn on the user's ear.

For another example, the at least one sensor 1360 may be installed in the earphones 1120 and 1130 of FIG. 11, or may detect sensor data regarding whether the earphones 1120 and 1130 are worn on the user's ear. The sensor data collecting unit 1509 may wirelessly receive the sensor data from the earphones 1120 and 1130 through the communication circuit 1370.

According to another embodiment, the sensor data collecting unit 1509 may acquire, from the at least one sensor 1360, sensor data regarding whether the electronic device 1300 is connected to or mounted on the external device such as a charging device or the like.

According to various embodiments, the sensor data collecting unit 1509 may acquire, from the at least one sensor 1360, sensor data regarding whether one portion of the electronic device 1300 is separated. For example, referring to FIG. 12A or 12B, the sensor data collecting unit 1509 may acquire, from the at least one sensor 1360 (e.g., the proximity sensor), sensor data regarding whether the earphones 1120 and 1130 is separated from the electronic device 1100.

Referring to FIG. 4 or 5 according to various embodiments, the sensor data collecting unit 1509 may acquire, from a sensor, a signal indicating a state where the cable 420 or 520 connected with the speaker 430 or 530 is extracted.

According to various embodiments, referring to FIG. 4, 5, or 11, in the automatic audio output mode, the audio output activating unit 1507 acquires, from the sensor data collecting unit 1509, sensor data regarding whether the earphone 430, 530, or 1120 is worn on the user's ear, and may activate an audio output. Alternatively, in the automatic audio output mode, if the sensor data regarding the state where the earphone 430, 530, or 1120 is worn on the user's ear is not provided from the sensor data collecting unit 1509, the audio output activating unit 1507 may deactivate the audio output.

According to various embodiments, referring to FIG. 11, in the automatic audio output mode, the audio output activating unit 1507 acquires, from the sensor data collecting unit 1509, sensor data regarding a state where both earphones 1120 and 1130 are worn respectively on both ears' of the user, and may activate a dual-mode audio output. For example, in the dual-mode audio output, a first part of stereo audio data may be decoded to acquire a first audio signal, and the first audio signal may be output through the first earphone 1120. In the dual-mode audio output, a second part of the stereo audio data may be decoded to acquire a second audio signal, and the second audio signal may be output through the second earphone 1130. A first sound for the first part and second sound for the second part of the stereo audio data reproduced by the electronic device (e.g., 1300 of FIG. 13) may be input respectively to both ears' of the user, and this may provide the user with experience of a stereophonic sound (a stereo sound). Alternatively, in the dual-mode audio data output, mono audio data may be decoded to acquire an audio signal, and the acquired audio signal may be output through the first earphone 1120 and the second earphone 1130 (a mono sound).

According to various embodiments, referring to FIG. 11, in the automatic audio output mode, the audio output activating unit 1507 may acquire, from the sensor data collecting unit 1509, sensor data regarding a state where only one of the both-side earphones 1120 and 1130 is worn on the user's ear, and may activate a non-dual mode audio output. In the non-dual mode audio output, even if audio data is stereo audio data, the stereo audio data may be entirely decoded to acquire an audio signal, and the acquired audio signal may be output through one earphone worn on the user's ear (a mono output).

According to various embodiments, in the automatic audio output mode, the audio output activating unit 1507 may acquire, from the sensor data collecting unit 1509, sensor data regarding a movement of the electronic device 1300, and may activate or deactivate an audio output. For example, upon acquiring sensor data indicating that the electronic device 1300 is in a pre-defined movement state, the audio output activating unit 1507 may activate the audio output.

According to various embodiments, in the automatic audio output mode, when a signal indicating a state where a cable (e.g., 420 of FIG. 4 or 520 of FIG. 5) connected with the speaker is extracted is delivered to the sensor data collecting unit 1509, the audio output activating unit 1507 may activate the audio output.

According to various embodiments, in the automatic audio output mode, the audio output activating unit 1507 may acquire sensor data regarding user's biometric information from the sensor data collecting unit 1509, and may activate or deactivate the audio output. For example, the audio output activating unit 1507 may activate the audio output upon acquiring sensor data indicating a state where a user's heart rate is increased.

For another example, the audio output activating unit 1507 may activate the audio output when the electronic device 1300 is connected for communication to the external device. For example, in a call mode, the electronic device 1300 may receive a call-related audio signal from the external device, and may output the audio signal through a speaker. Alternatively, in the call mode, the electronic device 1300 may input a voice signal from a microphone of the input device 1310, and may output (transmit) the voice signal to the external device. For another example, in an audio streaming mode, the electronic device 1300 may reproduce audio data stored in the memory (1320 of FIG. 13) to generate an audio signal, and may output (transmit) the audio signal to the external device (e.g., a car).

According to an embodiment of the present disclosure, an electronic device may include a housing having a wearable shape that can be worn on a human body, a coupling device disposed to at least one area of the housing and changeable from a first state to a second state so that the housing is coupled to an external object, an input signal generating device for generating an input signal when the coupling device is changed to the second state, and a control circuit for executing at least one instruction on the basis of at least one input signal generated from the input signal generating device.

According to an embodiment of the present disclosure, the coupling device may include a moving member changed to the second state in the housing by external force, and an elastic member for providing force to restore the moving member to the first state when the moving member is changed to the second state. When the moving member is changed to the second state, one part of the moving member protrudes with respect to the housing, and a space capable of coupling the external object to the housing may be formed between the one part of the moving member and the housing. The input signal generating device may include a first contact and second contact installed in the coupling device, and when the coupling device is changed to the second state, the input signal may be generated by electrical connection between the first contact and the second contact.

According to an embodiment of the present disclosure, the housing may have a shape that can be worn on a user's neck.

According to an embodiment of the present disclosure, the housing may have a curved shape extended from one end portion to the other end portion, and may include a first extension portion extended from the one end portion to a first position, a second extension portion extended from the first position to a second position, and a third extension portion extended from the second position to the other end portion.

According to an embodiment of the present disclosure, the second extension portion may be thicker or thinner than the first extension portion and the third extension portion when viewed from cross-section along a length extended from the one end portion to the other end portion.

According to an embodiment of the present disclosure, the electronic device may further include a speaker detachable from at least one of the ears of a user.

According to an embodiment of the present disclosure, the electronic device may further include a cable extended from the housing. The speaker may be electrically connected to the control circuit through the cable.

According to an embodiment of the present disclosure, the electronic device may further include a communication circuit electrically connected to the control circuit. The speaker may be physically detached from the housing, and the speaker may wirelessly communicate with the communication circuit.

According to an embodiment of the present disclosure, the instruction may include an instruction for power-on or power-off of the electronic device.

According to an embodiment of the present disclosure, the control circuit may execute the instruction for the power-on of the electronic device when the input signal is continued for more than a threshold duration.

According to an embodiment of the present disclosure, the control circuit may execute the instruction for the power-off of the electronic device when the input signal is generated by a pre-set number of times in a pre-set duration.

According to an embodiment of the present disclosure, the electronic device may further include at least one sensor electrically connected to the control circuit. The control circuit may execute the at least one instruction on the basis of at least one part of sensor data from the at least one sensor.

According to an embodiment of the present disclosure, the control circuit may execute an instruction for outputting audio data on the basis of at least one part of the sensor data.

According to an embodiment of the present disclosure, the electronic device may further include a communication circuit electrically connected to the control circuit to receive the audio data from an external device in a wired or wireless fashion.

According to an embodiment of the present disclosure, the sensor data may be in regards to a movement state of the electronic device or a biometric state of the user.

According to an embodiment of the present disclosure, the cable may be inserted into the housing.

According to an embodiment of the present disclosure, the electronic device may further include a sensor electrically connected to the control circuit to sense a state where the cable is inserted. The control circuit may execute the at least one instruction on the basis of a signal from the sensor.

Figure 16:
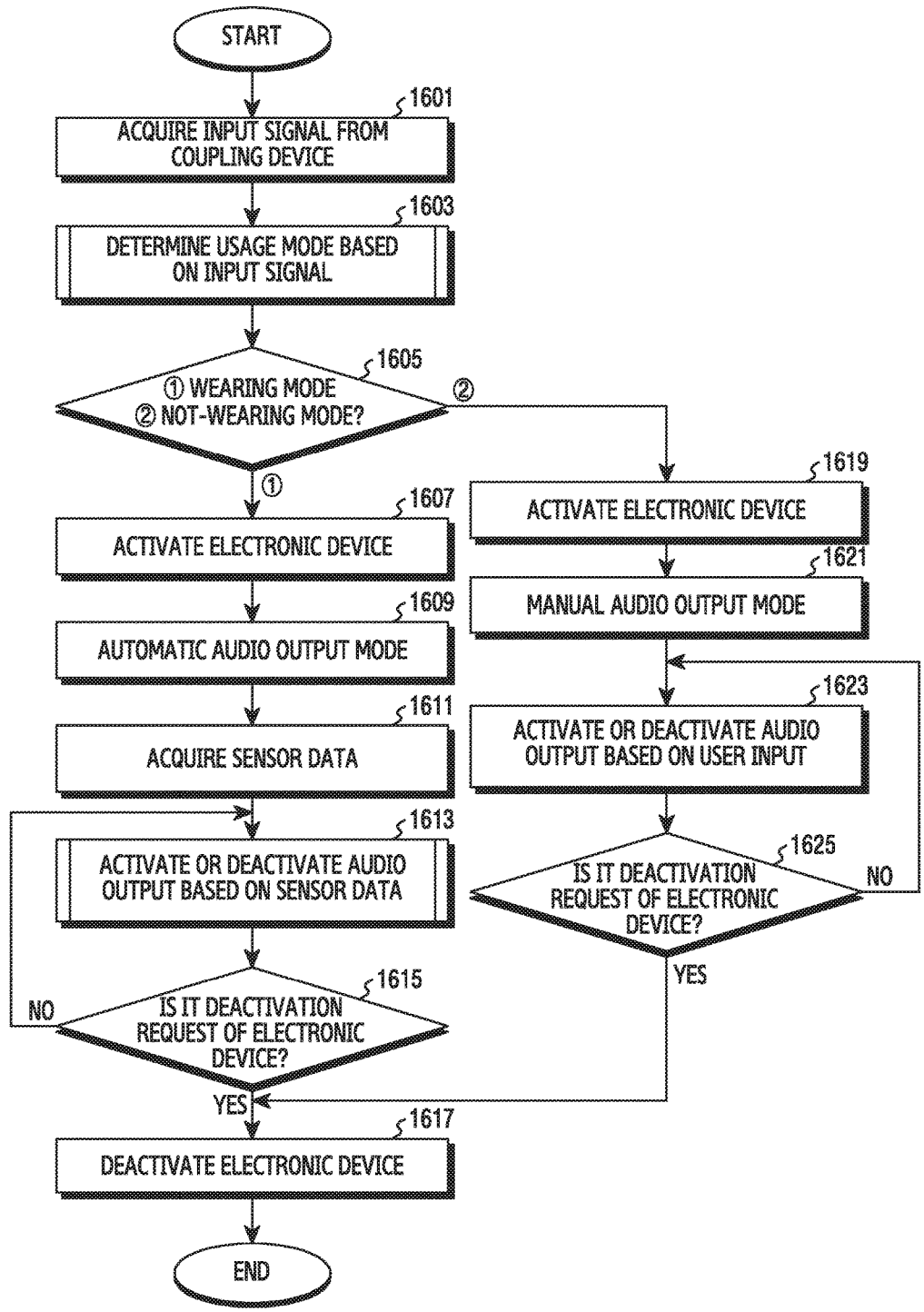
FIG. 16 is a flowchart illustrating an operation of an electronic device according to an embodiment of the present disclosure.

FIG. 16 is a flowchart illustrating an operation of an electronic device according to an embodiment of the present disclosure. According to various embodiments, the electronic device may include all or some of the electronic device 101 of FIG. 1, the electronic device 201 of FIG. 2, the electronic device 400 of FIG. 4, the electronic device 500 of FIG. 5, the electronic device 1100 of FIG. 11, and the electronic device 1300 of FIG. 13.

Referring to FIG. 16, in operation 1601, a control circuit (e.g., the control circuit 1390 of FIG. 13) may acquire an input signal. According to an embodiment, the control circuit 1390 may acquire an input signal indicating a state of a coupling device (e.g., 450 of FIG. 4, 550 of FIG. 5, or 1150 of FIG. 11) from an input device (e.g., 1310 of FIG. 13). The state of the coupling device 450, 550, or 1150 may include a first state where the coupling device 450, 550, or 1150 is difficult to be mechanically coupled to the external object or a second state where the coupling device 450, 550, or 1150 can be mechanically coupled to the external object.

In operation 1603, the control circuit 1390 may determine a usage mode on the basis of at least one part of the input signal. According to an embodiment, the usage mode may include a wearing mode or a not-wearing mode. Referring to FIG. 4, for example, the wearing mode may imply a program or application used in a state where the electronic device 400 is worn on a user's neck. Alternatively, the not-wearing mode may imply a program or application used in a state where the electronic device 400 is not worn on the user's neck.

According to an embodiment, when a coupling device (e.g., 450 of FIG. 4, 550 of FIG. 5, or 1150 of FIG. 11) remains in the second state for a time greater than or equal to a threshold time, a first input signal corresponding thereto may be generated from an input device (e.g., 1310 of FIG. 13). The control circuit 1390 may determine the wearing mode on the basis of the first input signal. For example, the wearing mode may be performed when the coupling device 450, 550, or 1150 remains in a state of being coupled to an external object (e.g., a user's clothing).

According to another embodiment, when the coupling device (e.g., 450 of FIG. 4, 550 of FIG. 5, or 1150 of FIG. 11) is changed from the first state to the second state by a pre-set number of times within a pre-set time, a second input signal corresponding thereto may be generated from the input device 1310 of FIG. 13. The control circuit 1390 may determine the not-wearing mode on the basis of the second input signal. For example, when the coupling device 450, 550, or 1150 is manipulated in a state where the coupling device 450, 550, or 1150 is not coupled to the external object (e.g., the user's clothing), the not-wearing mode may be performed.

When the wearing mode is determined in operation 1605, in operation 1607, the control circuit 1390 may activate the electronic device 1300 (e.g., power-on). In operation 1609, the control circuit 1390 may activate the automatic audio output mode according to the wearing mode.

When the automatic audio output mode is activated, in operation 1611, the control circuit 1390 may activate at least one sensor (e.g., 1360 of FIG. 13), and may acquire sensor data from the at least one sensor 1360.

In operation 1613, the control circuit 1390 may automatically activate or deactivate the audio output on the basis of at least one part of the sensor data. According to various embodiments, the audio output may include an operation in which the electronic device (e.g., 1300 of FIG. 13) reproduces audio data stored in the memory 1320 and outputs it through a speaker. Alternatively, the audio output may include an operation of receiving an audio signal or audio data from an external device and outputting it through the speaker. Alternatively, the audio output may include an operation in which the electronic device 1300 transmits the audio signal or audio data to the external device.

For example, the control circuit 1390 may automatically activate the audio output on the basis of sensor data indicating a state where the earphone (e.g., 430 of FIG. 4, 530 of FIG. 5, or 1120 or 1130 of FIG. 11) is worn on a user's ear. For another example, the control circuit 1390 may automatically activate the audio output on the basis of sensor data indicating a state where the electronic device (e.g., 1300 of FIG. 13) moves in a pre-defined manner. For another example, the control circuit 1390 may automatically activate the audio output on the basis of sensor data indicating a state where user's biometric information is pre-defined.

According to various embodiments, the control circuit 1390 may automatically activate the audio output on the basis of an input signal or sensor data indicating a state where the electronic device 1300 is connected to the external device.

According to various embodiments, when the electronic device 1300 receives an audio signal or audio data from the external device, the control circuit 1390 may automatically activate the audio output.

According to an embodiment, when the audio output is activated, the control circuit 1390 may output audio data stored in a memory (e.g., 1320 of FIG. 13). For example, referring to FIG. 4, the control circuit 1390 may reproduce the audio data stored in the memory 1320 to generate an audio signal, and may output the audio signal through the earphone 430. For another example, referring to FIG. 11, the control circuit 1390 may reproduce the audio data stored in the memory 1320 to generate an audio signal, and may wirelessly transmit the audio signal to the earphones 1120 and 1130 through a communication circuit (e.g., 1370 of FIG. 13). The earphones 1120 and 1130 may receive the audio signal through the communication circuit 1370, and may output the audio signal. For another example, the control circuit 1390 may receive the audio signal from the external device in a wired or wireless fashion (e.g., Bluetooth audio streaming) through the communication circuit 1370, and may output the audio signal through the earphone (e.g., 430 of FIG. 4, 530 of FIG. 5, or 1120 and 1130 of FIG. 11).

In operation 1615, the control circuit 1390 may confirm whether a deactivation request of the electronic device 1300 is generated. If it is confirmed that the deactivation request of the electronic device 1300 is not generated, the control circuit 1390 may repeat operation 1613. If it is confirmed that the deactivation request of the electronic device 1300 is generated, the control circuit 1390 may perform the aforementioned operation 1617.

In operation 1617, the control circuit 1390 may deactivate the electronic device 1300 (e.g., power-off or shut-down). According to an embodiment, when an input signal is not generated from a coupling device (e.g., 450 of FIG. 4, 550 of FIG. 5, or 1150 of FIG. 11), the control circuit 1390 may recognize this as the deactivation request of the electronic device 1300.

If the not-wearing mode is determined in operation 1605, the control circuit 1390 may perform operation 1619. In operation 1619, the control circuit 1390 may activate the electronic device 1300 (e.g., power-on). In operation 1621, the control circuit 1390 may activate a manual audio output mode according to the not-wearing mode.

If the manual audio output mode is activated, in operation 1623, the control circuit 1390 may activate or deactivate an audio output on the basis of a user input detected through an input device (e.g., the input device 250 of FIG. 2) of the electronic device 1300. For example, in the manual audio output mode, if there is a user input through a button installed in the electronic device 1300, the audio output may be activated or deactivated.

In operation 1625, the control circuit 1390 may confirm whether the deactivation request of the electronic device 1300 is generated. If it is confirmed that the deactivation request of the electronic device 1300 is not generated, the control circuit 1390 may repeat operation 1623. If it is confirmed that the deactivation request of the electronic device 1300 is generated, the control circuit 1390 may perform the aforementioned operation 1617.

According to various embodiments, although not shown, the electronic device 1300 may be set to a standby mode (e.g., a sleep mode, a power-save mode, etc.) in a state where the audio output is deactivated.

Figure 17:
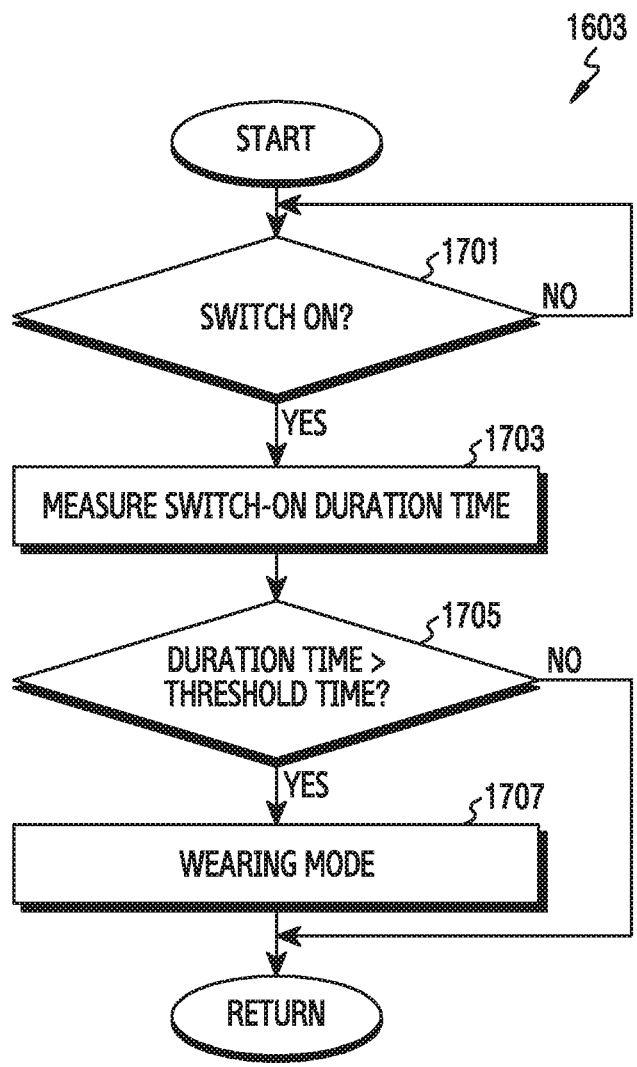
FIGS. 17 and 18 are flowcharts illustrating an operation of determining a usage mode on a basis of an input signal in operation 1603 of FIG. 16 according to various embodiments of the present disclosure.

FIG. 17 is a flowchart illustrating an operation of determining a usage mode on the basis of an input signal in operation 1603 of FIG. 16 according to an embodiment of the present disclosure.

Referring to FIG. 17, in operation 1701, a control circuit (e.g., 1390 of FIG. 13) may confirm whether a switch (e.g., 1430 of FIG. 14A) included in a coupling device (e.g., 450 of FIG. 4, 550 of FIG. 5, or 1150 of FIG. 11) is in an on-state. If it is confirmed that the switch 1430 is in the on-state, the control circuit 1390 may perform operation 1703.

In operation 1703, the control circuit 1390 may measure a duration time for which the switch 1430 remains in the on-state.

In operation 1705, the control circuit 1390 may confirm whether the measured duration exceeds a threshold time. For example, the threshold time may be various such as 1 second, 2 seconds, 3 seconds, etc. According to various embodiments, the threshold time may be defined by a user preference. If it is confirmed that the measured duration time does not exceed the threshold time, the control circuit 1390 may repeat operation 1701. If it is confirmed that the measured duration time exceeds the threshold time, the control circuit 1390 may perform operation 1707.

In operation 1707, the control circuit 1390 may perform a wearing mode. For example, when the coupling device (e.g., 450 of FIG. 4, 550 of FIG. 5, or 1150 of FIG. 11) remains in a second state for more than a threshold time, a first input signal corresponding thereto may be generated from the input device (e.g., 1310 of FIG. 13). The control circuit 1390 may determine the wearing mode on the basis of the first input signal. For example, when the coupling device 450, 505, or 1150 remains in a state of being coupled to an external object (e.g., a user's clothing), the wearing mode may be performed.

Figure 18:
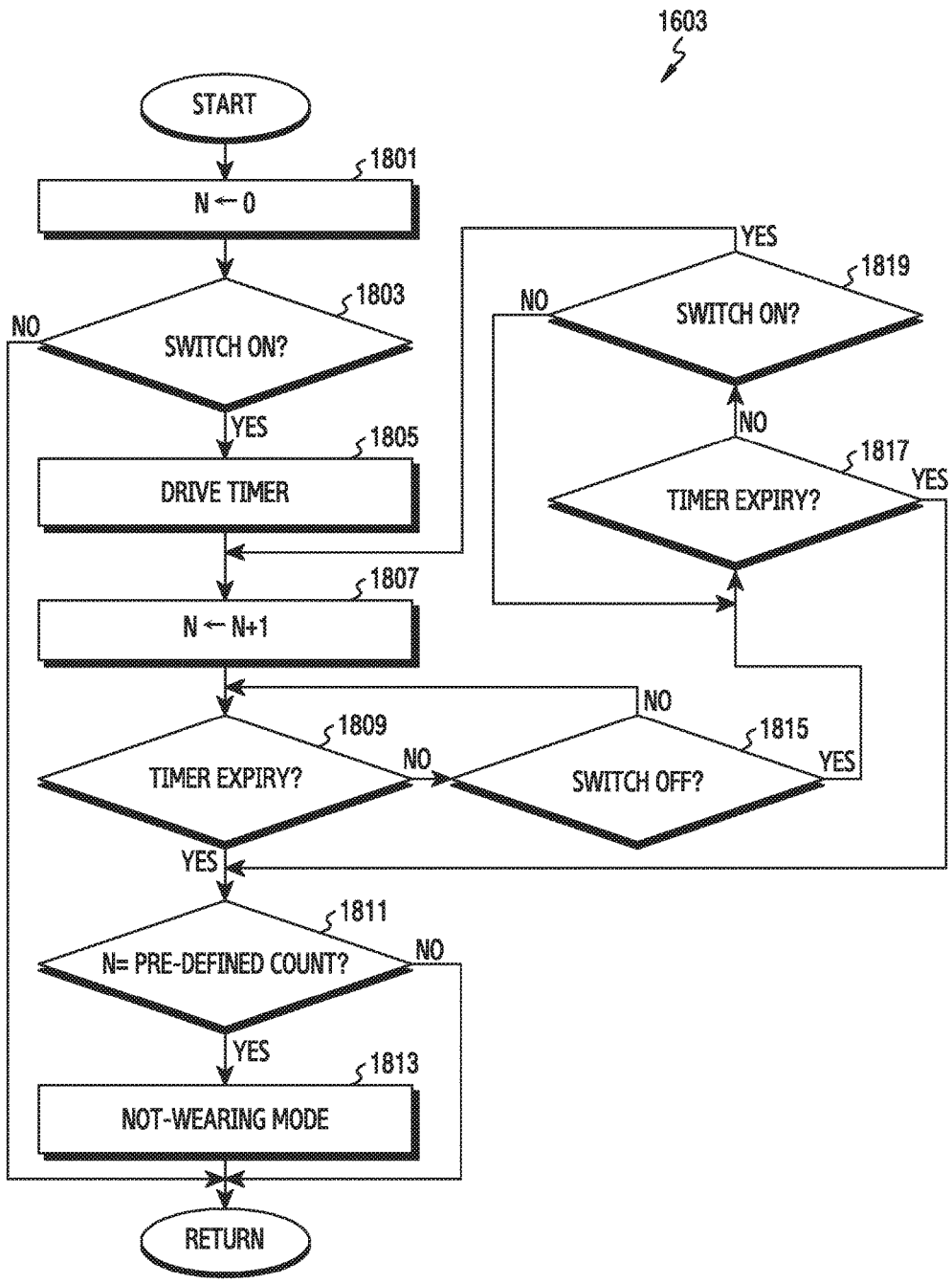

FIG. 18 is a flowchart illustrating an operation of determining a usage mode on the basis of an input signal in operation 1603 of FIG. 16 according to an embodiment of the present disclosure.

Referring to FIG. 18, in operation 1801, a control circuit 1390 may initialize a switch-on count N to '0'.

In operation 1803, a control circuit (e.g., 1390 of FIG. 13) may confirm whether a switch (e.g., 1430 of FIGS. 14A and 14B) included in a coupling device (e.g., 450 of FIG. 4, 550 of FIG. 5, or 1150 of FIG. 11) is in an on-state. If it is confirmed that the switch 1430 is in an off-state, the control circuit 1390 may repeat operation 1801. If it is confirmed that the switch 1430 is in the on-state, the control circuit 1390 may perform operation 1805.

In operation 1805, the control circuit 1390 may drive a timer.

In operation 1807, the control circuit 1390 may count the switch-on count N to 1 according to the on-state of the switch 1430.

In operation 1809, the control circuit 1390 may confirm whether the timer expires. If it is confirmed that the timer does not expire, the control circuit 1390 may perform operation 1815.

In operation 1815, the control circuit 1390 may confirm whether the switch 1430 is in the off-state. If it is confirmed that the switch 1430 is in the on-state, the control circuit 1390 may perform operation 1809. If it is confirmed that the switch 1430 is in the off-state, the control circuit 1390 may perform operation 1817.

In operation 1817, the control circuit 1390 may confirm whether the timer expires. If it is confirmed that the timer does not expire, the control circuit 1390 may perform operation 1819.

In operation 1819, the control circuit 1390 may confirm whether the switch 1430 is in the on-state. If it is confirmed that the switch 1430 is in the on-state, the control circuit 1390 may count the switch-on count N to 1 in operation 1807, and may perform operation 1809.

If it is confirmed in operation 1809 or operation 1817 that the timer expires, in operation 1811, the control circuit 1390 may confirm whether the counted switch-on count N is identical to a pre-defined number. If the counted switch-on count N is not identical to the pre-defined number, the control circuit 1390 may repeat operation 1801. Alternatively, if the counted switch-on count N is identical to the pre-defined number, the control circuit 1390 may perform operation 1813.

In operation 1813, the control circuit 1390 may perform a not-wearing mode. For example, referring to FIG. 4, in a state where the electronic device 400 is not worn on a user's neck, the coupling device 450 may transition from a first state to a second state within a time pre-set by a user. A switch of an input device (e.g., 1310 of FIG. 13) may be on two times within the pre-set time. The number of times by which the switch is on is 2, which may be equal to the pre-defined number, and the control circuit 1390 may perform the not-wearing mode.

Figure 19:
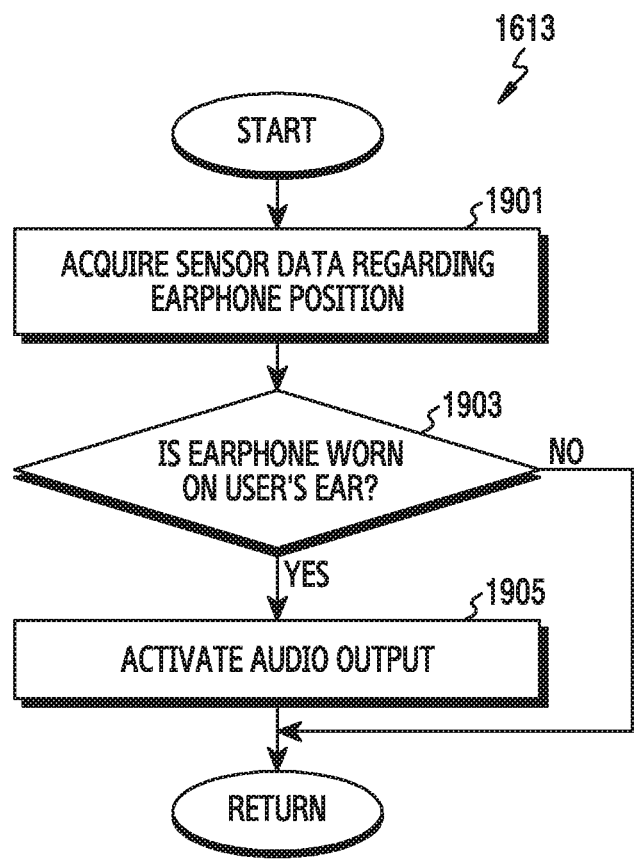
FIGS. 19, 20, 21, 22, and 23 are flowcharts illustrating an operation of activating or deactivating an audio output on a basis of sensor data in operation 1613 of FIG. 16 according to various embodiments of the present disclosure.

FIG. 19 is a flowchart illustrating an operation of activating or deactivating an audio output on the basis of sensor data in operation 1613 of FIG. 16 according to an embodiment of the present disclosure.

Referring to FIG. 19, in operation 1901, the control circuit 1390 may acquire sensor data regarding a position of an earphone (e.g., 430 of FIG. 4, 530 of FIG. 5, or 1120 or 1130 of FIG. 11) through at least one sensor (e.g., the sensor module 240 of FIG. 2).

In operation 1903, the control circuit 1390 may determine whether it is in a state where the earphone (e.g., 430 of FIG. 4, 530 of FIG. 5, or 1120 or 1130 of FIG. 11) is worn on the user's ear on the basis of the sensor data. Upon determining a state where the earphone is not worn on the user's ear, the control circuit 1390 may repeat operation 1901. Upon determining the state where the earphone is worn on the user's ear, the control circuit 1390 may perform operation 1905.

In operation 1905, the control circuit 1390 may activate an audio output. For example, if the audio output is activated, the control circuit 1390 may reproduce audio data stored in a memory (e.g., 1320 of FIG. 13) to generate an audio signal, and may output the audio signal through the earphone (e.g., 430 of FIG. 4, 530 of FIG. 5, or 1120 or 1130 of FIG. 11). For another example, the control circuit 1390 may receive the audio signal from an external device through a communication circuit (e.g., 1370 of FIG. 13) in a wired or wireless fashion (e.g., Bluetooth audio streaming), and may output the audio signal through the earphone (e.g., 430 of FIG. 4, 530 of FIG. 5, or 1120 or 1130 of FIG. 11).

Figure 20:
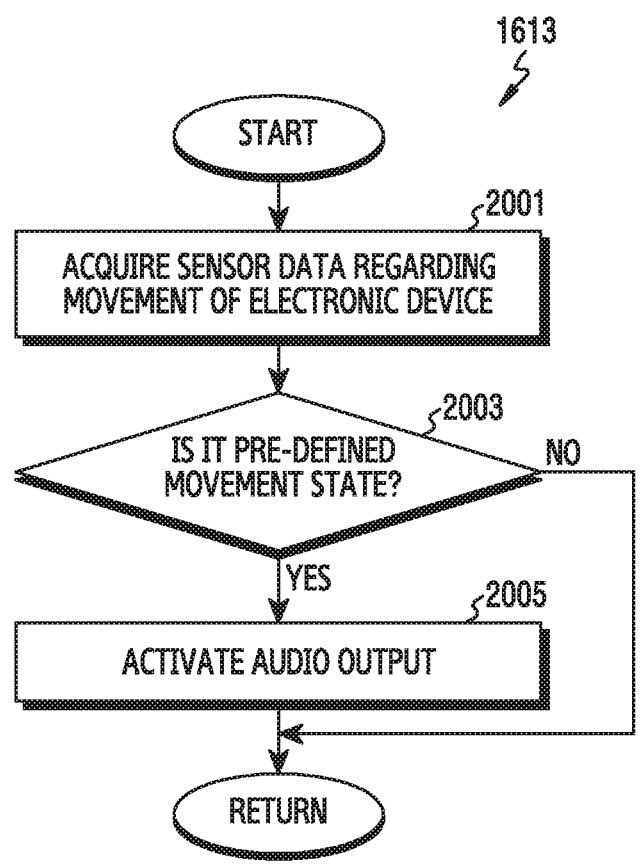

FIG. 20 is a flowchart illustrating an operation of activating or deactivating an audio output on a basis of sensor data in operation 1613 of FIG. 16 according to an embodiment of the present disclosure.

Referring to FIG. 20, in operation 2001, the control circuit 1390 may acquire sensor data regarding a movement of the electronic device 1300 through at least one sensor (e.g., the sensor module 240 of FIG. 2).

In operation 2003, the control circuit 1390 may determine whether an electronic device (e.g., 1300 of FIG. 13) is in a pre-defined movement state on the basis of sensor data. If it is determined that the electronic device 1300 is not in the pre-defined movement state, the control circuit 1390 may repeat operation 2001. If it is determined that the electronic device 1300 is in the pre-defined movement state, the control circuit 1390 may perform operation 2005.

In operation 2005, the control circuit 1390 may activate an audio output. For example, in a wearing mode, if it is detected that the electronic device 1300 moves faster than a pre-set speed, the control circuit 1390 may activate the audio output.

Referring to FIG. 4 or FIG. 5 according to various embodiments, data regarding a movement of the electronic device may include a state where the cable 420 or 520 is extracted. Upon detecting a signal indicating the state where the cable 420 or 520 is extracted, the control circuit 1390 may activate the audio signal.

Figure 21:
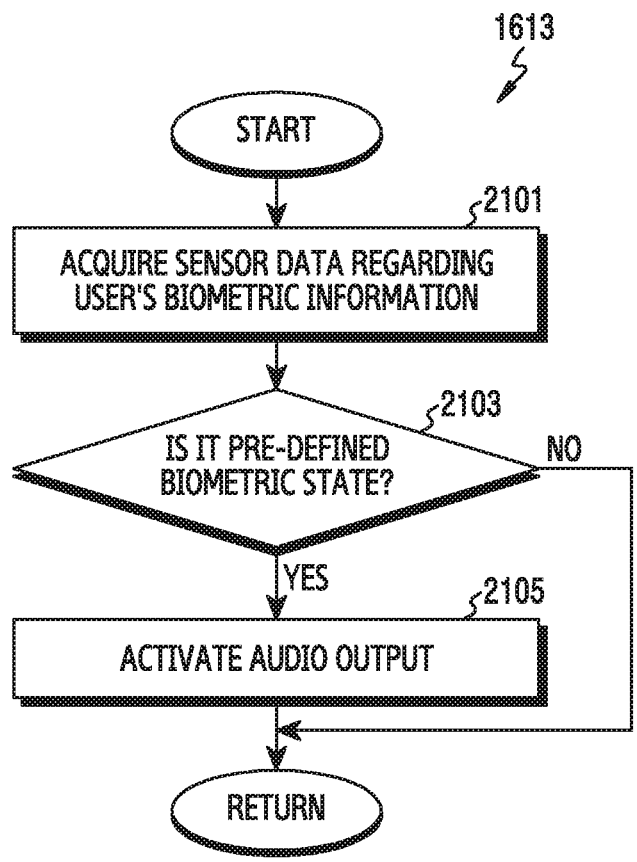

FIG. 21 is a flowchart illustrating an operation of activating or deactivating an audio output on a basis of sensor data in operation 1613 of FIG. 16 according to an embodiment of the present disclosure.

Referring to FIG. 21, in operation 2101, the control circuit 1390 may acquire sensor data regarding user's biometric information through at least one sensor (e.g., the sensor module 240 of FIG. 2).

In operation 2103, the control circuit 1390 may determine whether a user is in the pre-defined biometric state on the basis of the sensor data. If it is determined that the user is not in the pre-defined biometric state, the control circuit 1390 may repeat operation 2101. If it is determined that the user is in the pre-defined biometric state, the control circuit 1390 may repeat operation 2105.

In operation 2105, the control circuit 1390 may activate the audio output. For example, in the wearing mode, upon determining that a user's heart rate is faster than a pre-set number, the control circuit 1390 may activate the audio output.

Figure 22:
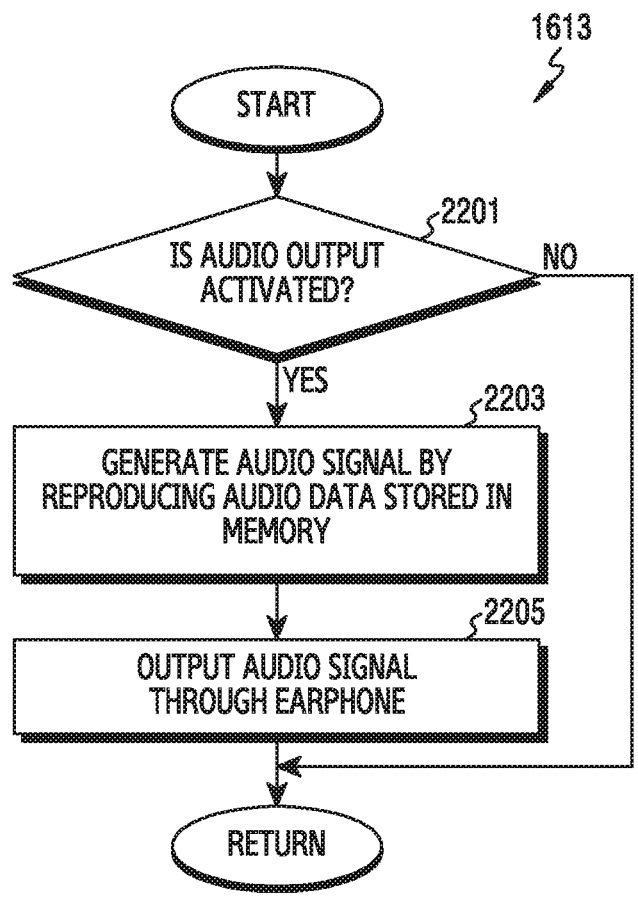

FIG. 22 is a flowchart illustrating an operation of activating or deactivating an audio output on the basis of sensor data in operation 1613 of FIG. 16 according to an embodiment of the present disclosure.

Referring to FIG. 22, in operation 2201, the control circuit 1390 may confirm whether it is a state where the audio output is activated. Upon confirming the state where the audio output is activated, the control circuit 1390 may perform operation 2203.

In operation 2203, the control circuit 1390 may generate an audio signal by reproducing audio data stored in a memory (e.g., 1320 of FIG. 13).

In operation 2205, the control circuit 1390 may output the audio signal through an earphone (e.g., 430 of FIG. 4, 530 of FIG. 5, or 1120 and 1130 of FIG. 11).

Figure 23:
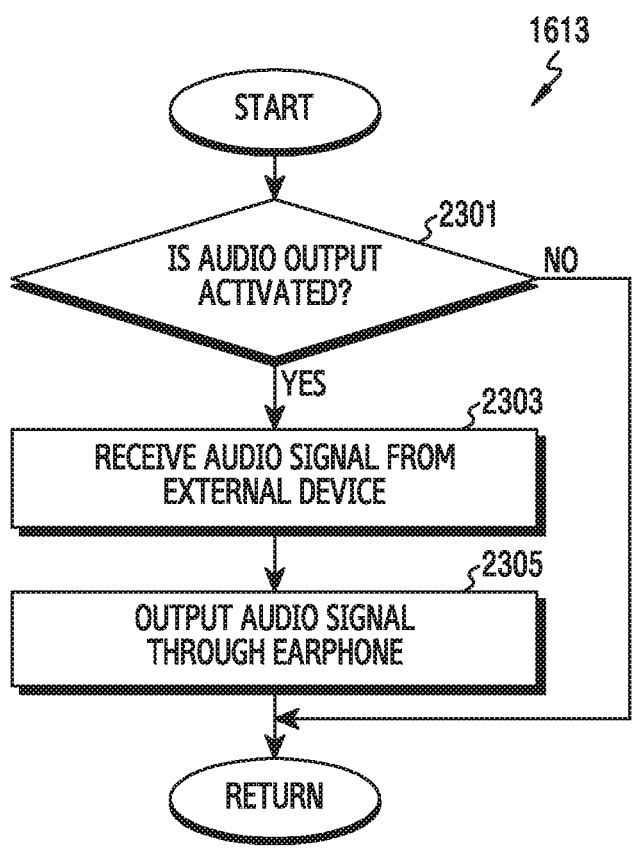

FIG. 23 is a flowchart illustrating an operation of activating or deactivating an audio output on the basis of sensor data in operation 1613 of FIG. 16 according to an embodiment of the present disclosure.

Referring to FIG. 23, in operation 2301, the control circuit 1390 may confirm whether it is a state where the audio output is activated. Upon confirming the state where the audio output is activated, the control circuit 1390 may perform operation 2203.

In operation 2203, the control circuit 1390 may receive the audio signal from an external device.

In operation 2305, the control circuit 1390 may output the audio signal through the earphone (e.g., 430 of FIG. 4, 530 of FIG. 5, or 1120 and 1130 of FIG. 11). For example, referring to FIG. 11, the control circuit 1390 may transmit the audio signal received from the external device to the earphone 1120 or 1130 through near-distance wireless communication.

According to an embodiment of the present disclosure, it is provided an operating method of an electronic device including a housing having a wearable shape that can be worn on a human body, and a coupling device changeable from a first state to a second state by external force so that an external object can be coupled to the housing. The method may include sensing at least one input signal generated when the coupling device is changed to the second state, activating the electronic device on the basis of at least one part of the at least one input signal, acquiring sensor data from at least one sensor of the electronic device, and reproducing audio data stored in a memory of the electronic device on the basis of at least one part of the sensor data.

According to an embodiment of the present disclosure, the sensor data may be in regards to a movement state of the electronic device or a biometric state of a user.

According to an embodiment of the present disclosure, the operating method may further include confirming whether the electronic device is in a state of being worn on a user on the basis of at least one part of the at least one input signal. When it is confirmed that the electronic device is in the state of being worn on the user, audio data stored in a memory of the electronic device may be reproduced on the basis of at least one part of the sensor data.

Meanwhile, the aforementioned embodiments of the present disclosure may be writable as a program executable in a computer, and may be implemented in a general purpose digital computer for operating the program by using a computer-readable recording medium. In addition, a data structure used in the aforementioned embodiment of the present disclosure may be recorded in the computer-readable recording medium through several means. The computer-readable recording medium includes a storage medium such as a magnetic medium (e.g., a ROM, a floppy disc, a hard disc, etc.) and an optical storage medium (e.g., a CD-ROM, a DVD, etc.).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a housing having a wearable shape;
   a coupling device disposed to at least one area of the housing and changeable from a first state to a second state;
   an input signal generating device for generating at least one input signal; and
   a control circuit configured to execute at least one instruction based on the at least one input signal,
   wherein the input signal generating device comprises a first contact and a second contact installed in the coupling device,
   wherein the coupling device comprises a moving member including a slide groove, and the moving member is slidably moved relative to at least a part of the housing as the coupling device is changed from the first state to the second state, and wherein the at least one input signal is generated by an electrical connection between the first contact and the second contact in response to the movement of the moving member.

2. The electronic device of claim 1,
wherein the coupling device comprises:
an elastic member for providing force to restore the moving member to the first state when the moving member is changed to the second state,
wherein, when the moving member is changed to the second state, one part of the moving member protrudes with respect to the housing, and a space capable of coupling an external object to the housing is formed between the one part of the moving member and the housing.

3. The electronic device of claim 1, wherein the housing has a shape configured to be worn on a user's neck.

4. The electronic device of claim 3,
wherein the housing has a curved shape extended from one end portion to the other end portion, and
wherein the housing comprises a first extension portion extended from the one end portion to a first position, a second extension portion extended from the first position to a second position, and a third extension portion extended from the second position to the other end portion.

5. The electronic device of claim 4,
wherein the second extension portion is thicker or thinner than the first extension portion, and
wherein the third extension portion when viewed from cross-section along a length extended from the one end portion to the other end portion.

6. The electronic device of claim 1, further comprising a speaker configured to detach from at least one of ears of a user.

7. The electronic device of claim 6, further comprising a cable extended from the housing,
wherein the speaker is electrically connected to the control circuit through the cable.

8. The electronic device of claim 6, further comprising a communication circuit electrically connected to the control circuit,
wherein the speaker is configured to physically detach from the housing, and
wherein the speaker is configured to wirelessly communicate with the communication circuit.

9. The electronic device of claim 1, wherein the instruction comprises an instruction for power-on or power-off of the electronic device.

10. The electronic device of claim 9, wherein the control circuit is configured to execute the instruction for the power-on of the electronic device when the input signal is continued for more than a threshold duration.

11. The electronic device of claim 9, wherein the control circuit is configured to execute the instruction for the power-on of the electronic device when the input signal is generated by a pre-set number of times in a pre-set duration.

12. The electronic device of claim 1, further comprising at least one sensor electrically connected to the control circuit,
wherein the control circuit is configured to execute the at least one instruction on a basis of at least one part of sensor data from the at least one sensor.

13. The electronic device of claim 12, wherein the control circuit is configured to execute an instruction for outputting audio data on the basis of at least one part of the sensor data.

14. The electronic device of claim 13, further comprising a communication circuit electrically connected to the control circuit and configured to receive the audio data from an external device in a wired or wireless fashion.

15. The electronic device of claim 13, wherein the sensor data comprises one of a movement state of the electronic device or a biometric state of a user.

16. The electronic device of claim 7, wherein the cable is configured to be inserted into the housing.

17. The electronic device of claim 16, further comprising a sensor electrically connected to the control circuit and configured to sense a state where the cable is inserted,
wherein the control circuit executes the at least one instruction on a basis of a signal from the sensor.

18. An operating method of an electronic device comprising a housing having a wearable shape and a coupling device changeable from a first state to a second state by external force so that an external object can be coupled to the housing, and an input signal generating device for generating at least one input signal the method comprising:
sensing at least one input signal generated when the coupling device is changed to the second state;
activating the electronic device on a basis of at least one part of the at least one input signal;
acquiring sensor data from at least one sensor of the electronic device; and
reproducing audio data stored in a memory of the electronic device on a basis of at least one part of the sensor data,
wherein the input signal generating device comprises a first contact and a second contact installed in the coupling device,
wherein the coupling device comprises a moving member including a slide groove, and the moving member is slidably moved relative to at least a part of the housing as the coupling device is changed from the first state to the second state, and
wherein the at least one input signal is generated by an electrical connection between the first contact and the second contact in response to the movement of the moving member.

19. The method of claim 18, wherein the sensor data comprises one of a movement state of the electronic device or a biometric state of a user.

20. The method of claim 18, further comprising confirming whether the electronic device is in a state of being worn by a user on the basis of at least one part of the at least one input signal,
wherein, when it is confirmed that the electronic device is in the state of being worn by the user, audio data stored in a memory of the electronic device is reproduced on the basis of at least one part of the sensor data.

* * * * *